United States Patent [19]
Hsu et al.

[11] Patent Number: 6,134,340
[45] Date of Patent: Oct. 17, 2000

[54] FINGERPRINT FEATURE CORRELATOR

[75] Inventors: Shi-Ping Hsu, Pasadena; Bruce W. Evans, Redondo Beach, both of Calif.

[73] Assignee: TRW Inc., Redondo Beach, Calif.

[21] Appl. No.: 08/995,330

[22] Filed: Dec. 22, 1997

[51] Int. Cl.[7] .............................. G06K 9/00; G06K 9/44
[52] U.S. Cl. ......................... 382/124; 382/125; 382/258
[58] Field of Search .................................. 382/124, 125, 382/209, 258, 259, 116; 283/69; 356/71

[56] References Cited

U.S. PATENT DOCUMENTS

| | | | |
|---|---|---|---|
| 4,646,352 | 2/1987 | Asai ......................................... | 382/125 |
| 4,790,564 | 12/1988 | Larcher et al. .......................... | 382/125 |
| 4,896,363 | 1/1990 | Taylor et al. ............................ | 382/125 |
| 5,067,162 | 11/1991 | Driscoll, Jr. et al. ................... | 382/125 |

OTHER PUBLICATIONS

Nalini K. Ratha, Kalle Karu, Shaoyun Chen, and Anil K. Jain, A Real–Time Matching System for Large Fingerprint Databases, IEEE Transactions on Pattern Analysis and Machine Intelligence, vol. 18, No. 8, Aug. 1, 1996, pp. 799–812.

S. Anderson, W. H. Bruce, P. B. Denyer, D. Renshaw and G. Wang, A Single Chip Sensor & Image Processor for Fingerprint Verification, Proceedings of the Custom Integrated Circuits Conference, San Diego, May 12–15, 1991, Conf. 13, May 12, 1991, pp. 12.1.1–12.1.4.

Hironori Yahagi, Seigo Igaki and Fumio Yamagishi, Moving Window Algorithm for Fast Fingerprint Verification, Technologies Today and Tomorrow, New Orleans, Apr. 1–4, 1990, vol. 1, Apr. 1, 1990, pp. 343–347.

*Primary Examiner*—Leo H. Boudreau
*Assistant Examiner*—Shawn Cage
*Attorney, Agent, or Firm*—Michael S. Yatsko

[57] ABSTRACT

A device, and a method for its operation, for verifying a person's identity by comparing in a correlator (18) selected features of a reference fingerprint image, generated in a sensor (10) from the fingerprint of a person of known identity, with a subject fingerprint image taken from a person whose identity is to be verified. In an enrollment procedure, a fingerprint from a person of known identity is analyzed in an enrollment processor (14) to locate multiple reference patches that together are distinctive to that person's fingerprint. The reference patch images are stored, together with their locations in the image, in a reference image storage unit (16). When a subject fingerprint image is later provided, every reference patch is compared with every possible patch of similar size in the subject image, to find a set of candidate match locations in the subject image. Then a subset of the candidate match locations is selected such that the candidate match locations in the subset are practically geometrically congruent with the locations of a corresponding subset of reference patches. A verification match is declared based on the number candidate match locations in the selected subset that satisfies this geometric constraint.

16 Claims, 18 Drawing Sheets

|     | (1) | (2) | (3) | (4) | (5) | (6) | (7) |
|-----|-----|-----|-----|-----|-----|-----|-----|
| (1) | 0 | 1 | 0 | 0 | 1 | 0 | 0 |
| (2) | 1 | 0 | 0 | 1 | 1 | 1 | 1 |
| (3) | 0 | 0 | 0 | 0 | 1 | 0 | 0 |
| (4) | 0 | 1 | 0 | 0 | 0 | 1 | 1 |
| (5) | 1 | 1 | 1 | 0 | 0 | 1 | 1 |
| (6) | 0 | 1 | 0 | 1 | 1 | 0 | 1 |
| (7) | 0 | 1 | 0 | 1 | 1 | 1 | 0 |
FIG. 19
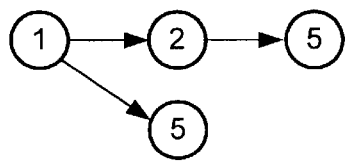
FIG. 20A
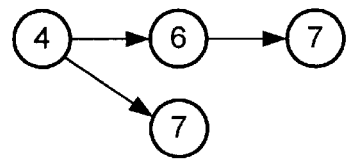
FIG. 20D
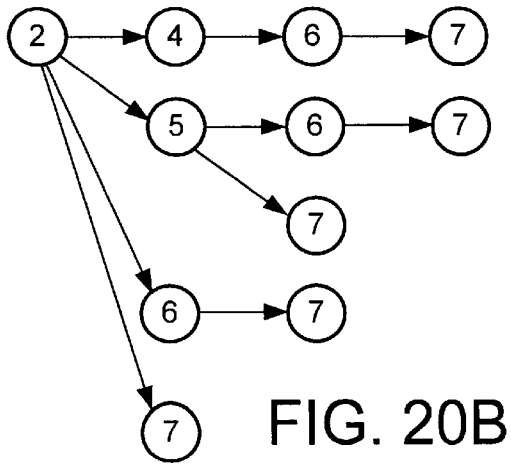
FIG. 20B
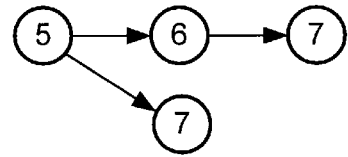
FIG. 20E
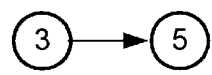
FIG. 20C
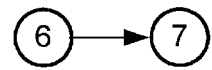
FIG. 20F

FINGERPRINT FEATURE CORRELATOR

This invention relates generally to pattern recognition systems and, more particularly, to a system and method for comparing two fingerprint images and determining whether or not they are from the same person. Fingerprints are, of course, widely used in criminal investigation work, and fingerprints are routinely taken from applicants for jobs, security clearances, citizenship, and so forth. For these and many other applications of fingerprint image processing, it is most often required to compare one fingerprint with many others, in an effort to find a match. So called "minutia matching" approaches are commonly used in such search applications. In these approaches a small amount of characteristic data is extracted from a fingerprint image. This data may be quickly compared with corresponding data from another image to determine if the imaged prints match. Extraction of this data is a complex process, and is relatively time consuming even on a powerful computer. For search applications, this is acceptable because the extracted minutia data are reused many times, so that the minutia extraction overhead is amortized over a large number of comparisons.

By way of contrast, the present invention pertains to the use of fingerprint images for purposes of verification of a person's identity. In this application, the person "enrolls" in a system by supplying a reference fingerprint image. When the same person's fingerprint image is subsequently scanned for purposes of gaining access to a protected property, the newly scanned image is compared with the reference image for verification. In many practical applications of fingerprint verification, such as for access to vehicles, buildings or computers, the process must be completed in a matter of seconds, preferably using an inexpensive computer processor.

Many fingerprint matching systems developed or proposed for verification purposes have followed much the same principles used in larger identification systems, using pattern minutia extraction and matching. Because the minutia extraction process involves complex and heterogeneous mathematical operations, and must be performed each time a finger is presented for verification, a powerful general-purpose computer processor is required in order to perform a comparison within an acceptable time. As a result, such systems are large in size and high in cost. Their application has therefore been limited, usually to the protection of important sites or computer installations for which the high cost is warranted and space is available.

Fingerprint image correlation is an alternative to minutia based approaches. It is attractive because correlation operations have a simple, repetitive mathematical structure, which is suited to implementation by custom computing hardware utilizing high levels of parallelism to achieve rapid processing. Such hardware can be realized compactly and inexpensively as an application specific integrated circuit (ASIC). U.S. Pat. No. 5,067,162 to Driscoll, Jr. et al. Discloses a method and apparatus for verifying identity using fingerprint image correlation, but their apparatus is controlled by a programmable general purpose computer processor. Use of a programmable computer to implement the correlation of the two fingerprint images poses a difficult design choice between accuracy of results and speed of processing. In general, a high level of accuracy degrades the speed of processing to a degree that makes such a configuration unsuitable for many applications.

It will be appreciated from the foregoing that there is still a significant need for a fingerprint correlation technique that will operate rapidly and reliably, but which may be implemented in a compact package at relatively low cost. As will become apparent from the following summary, the present invention meets this need.

SUMMARY OF THE INVENTION

The present invention resides in a fingerprint feature correlator using a processing method that can be implemented in significant part in integrated circuitry, to provide fast processing without compromising reliability. It will be understood that the term "fingerprint" includes thumb print, palm print, and other similar biometric indicators used for identification.

Briefly, and in general terms, the fingerprint correlator of the invention comprises a fingerprint sensor, for generating a digital image of a fingerprint; an enrollment processor for extracting, from a fingerprint image generated by the fingerprint sensor from the fingerprint of an identified person, multiple reference patches that together uniquely identify the image; reference image storage means, for storing reference patch images and locations provided by the enrollment processor; a correlation processor for searching the subject fingerprint image generated by the fingerprint sensor from the fingerprint of a person seeking identity verification for instances of two dimensional pixel patterns sufficiently similar to the patterns of the stored reference patches, and for generating a set of candidate match locations in the subject image corresponding to the location of each such instance for each reference patch; and a geometric constraint checking processor, for attempting to locate in the set of candidate match locations a subset of locations that is geometrically congruent with a corresponding subset of reference patch locations, to a desired degree of accuracy, and for determining whether there is a match between the subject image and the stored reference image. The feature correlator also includes an image preprocessor, for converting the digital image of the fingerprint to binary form, removing extraneous background and, optionally, rotating the image to a standard orientation.

More specifically, the enrollment processor includes means for binarizing the gray scale digital image and thinning the binary image to obtain skeletal images of ridges and valleys in the fingerprint; means for analyzing the skeletal images to locate bifurcation features in the ridges and valleys; means for selecting reference patches based on feature density, and storing the reference patch locations in the reference image storage means; and means for extracting reference patch images from the skeletal images of the ridges and valleys and storing the reference patch images in the reference image storage means with the corresponding reference patch locations.

An important aspect of the invention is the correlation processor, which compares the pixels in every reference patch selected by the enrollment processor with the pixels in every possible patch location in the subject fingerprint image, to determine the locations of patches in the subject image that match, or nearly match, any of the reference patches. The correlation processor includes an array of correlator units, each for comparing a selected pixel from a reference patch with a selected pixel in the subject image, wherein the entire array simultaneously compares the selected pixel from each of a plurality of reference patches with a plurality of pixels in a block of pixels from the subject image; an address generator, for generating a sequence of addresses for accessing successive pixels in the plurality of reference patches, and another sequence of addresses for accessing successive blocks of pixels in the subject image, wherein each reference patch is compared with every possible patch position in the subject image; and a result collection memory, for recording pixel match count data pertaining to every possible match candidate position in the subject image, along with candidate match locations in the subject image. Preferably, the address generator further includes means for generating rotated reference patch addresses in such a way that a rotated image of each reference patch is also compared with each possible patch of the subject image. In particular, the means for generating rotated reference patch addresses includes means for storing multiple sets of two-dimensional offset addresses, each set of offset addresses defining a different rotation angle. By this means, each reference patch is compared with each possible patch of the subject image at multiple orientation angles.

Each correlator unit in the correlation processor includes a counter for recording a count indicative of the degree of match between a reference patch and a patch of the subject image; and the correlation processor further includes means for saving the contents of the counters in the result collection memory on completion of a comparison of all pixels in the reference patches, and means for saving a subject image location with each count, and means for resetting the counters to begin a comparison with other locations in the subject image. The correlation processor further includes means rendered operative at the conclusion of all matching operations of the correlation processor, for selecting a set of match candidates from the results saved in the result collection memory. The latter means for selecting a set of match candidates includes means for discarding match candidates that are positioned the subject image relatively close to a better candidate.

Another important feature of the invention is the geometric constraint checking processor, which includes means for determining the distances between all possible pairs of reference patches; means for determining the distances between all possible pairs of distinct match candidates; means for selecting a feasible subset of the distinct match candidates such that the distances between all possible pairs in the feasible subset are approximately equal to the distances between corresponding pairs of reference patches; and means for declaring a match based on the size of the feasible subset.

The invention may also be defined in terms of a method for verifying a person's identity using fingerprint feature correlation. Briefly, the method comprises the steps of sensing a fingerprint of an identified person wanting to enroll a fingerprint image; generating a digital image of the fingerprint; enrolling the fingerprint image, by finding and extracting multiple reference patches that together uniquely identify the image; storing the extracted reference patch images and their locations in a reference image memory; sensing a subject fingerprint image of a person wanting identity verification; generating a digital subject fingerprint image from the sensed subject fingerprint image; searching the subject fingerprint image for instances of pixel patterns similar to the stored reference patch images, or with similar to rotated forms of the stored reference patches; generating a set of match candidates and their locations in the subject image; attempting to locate in the set of match candidates a subset of match candidates that is geometrically congruent with a corresponding subset of reference patches, to a desired degree of accuracy; and determining whether there is a match between the subject image and the stored reference image. The method as disclosed also includes preprocessing the digital image, by converting the digital image of the fingerprint to binary form, removing extraneous background picture elements, and optionally adjusting the image to a standard orientation.

More specifically, the enrolling step includes thinning the binary image to obtain skeletal images of ridges and valleys in the fingerprint; analyzing the skeletal images to locate bifurcation features in the ridges and valleys; selecting reference patches based on feature density; and extracting reference patch images from the skeletal images of the ridges and valleys.

The comparing step of the basic method includes comparing, in a correlator unit that is one member of an array of correlator units, a selected pixel from a reference patch with a selected pixel in the subject image, wherein the entire array simultaneously compares the selected pixel from each of a plurality of reference patches with a plurality of pixels in a block of pixels from the subject image; generating a sequence of addresses for accessing successive pixels in the plurality of reference patches, and another sequence of addresses for accessing successive blocks of pixels in the subject image, wherein each reference patch is compared with every possible patch position in the subject image; and recording, in a result collection memory, pixel match count data pertaining to every possible match candidate position in the subject image, along with match candidate locations in the subject image. More specifically, the step of generating addresses further includes generating rotated reference patch addresses in such a way that a rotated image of each reference patch is also compared with each possible patch of the subject image. The step of generating rotated reference patch addresses includes storing multiple sets of two-dimensional offset addresses, each set of offset addresses defining a different rotation angle, and wherein each reference patch is compared with each possible patch of the subject image at multiple orientation angles.

Each step of comparing in a correlator unit includes recording a count indicative of the degree of match between a reference patch and a patch of the subject image; and the method further comprises the steps of saving the counts in the result collection memory on completion of a comparison of all pixels in the reference patches, saving a subject image location with each count, and resetting the counts to begin a comparison with other locations in the subject image. The method may also comprise the step, performed at the conclusion of all matching operations, of selecting a set of match candidates from the results saved in the result collection memory. This step of selecting a set of match candidates includes discarding match candidates that are positioned in the subject image relatively close to a better candidate.

Finally, the step of attempting to locate in the set of match candidates a subset of match candidates that is approximately geometrically congruent with a corresponding subset of reference patches, includes determining the distances between all possible pairs of reference patches; determining the distances between all possible pairs of distinct match candidates; selecting a feasible subset of the distinct match candidates such that the distances between all possible pairs in the feasible subset are approximately equal to the distances between corresponding pairs of reference patches; and declaring a match based on the size of the feasible subset. These distance tests do not preclude the possibility that the feasible subset is a mirror image of the corresponding reference locations, and, therefore, lacks the desired geometric congruency with the reference locations. Elimination of this possibility requires the incorporation of an additional test into the feasible set selection process.

It will be appreciated from the foregoing summary that the present invention represents a significant advance in the field of fingerprint image comparison for purposes of identity verification. In particular, the invention provides a reliable but very fast technique for comparing the distinguishing features of two fingerprint images Other aspects and advantages of the invention will become apparent from the following more detailed description, taken in conjunction with the accompanying drawings.

BRIEF DESCRIPTION OF THE DRAWINGS

FIG. 19 is an illustrative match candidate matrix;

FIGS. 20A–20F are diagrams of all of the feasible canonical representations corresponding to the match candidate matrix of FIG. 19;

DESCRIPTION OF THE PREFERRED EMBODIMENT

Figure 1:
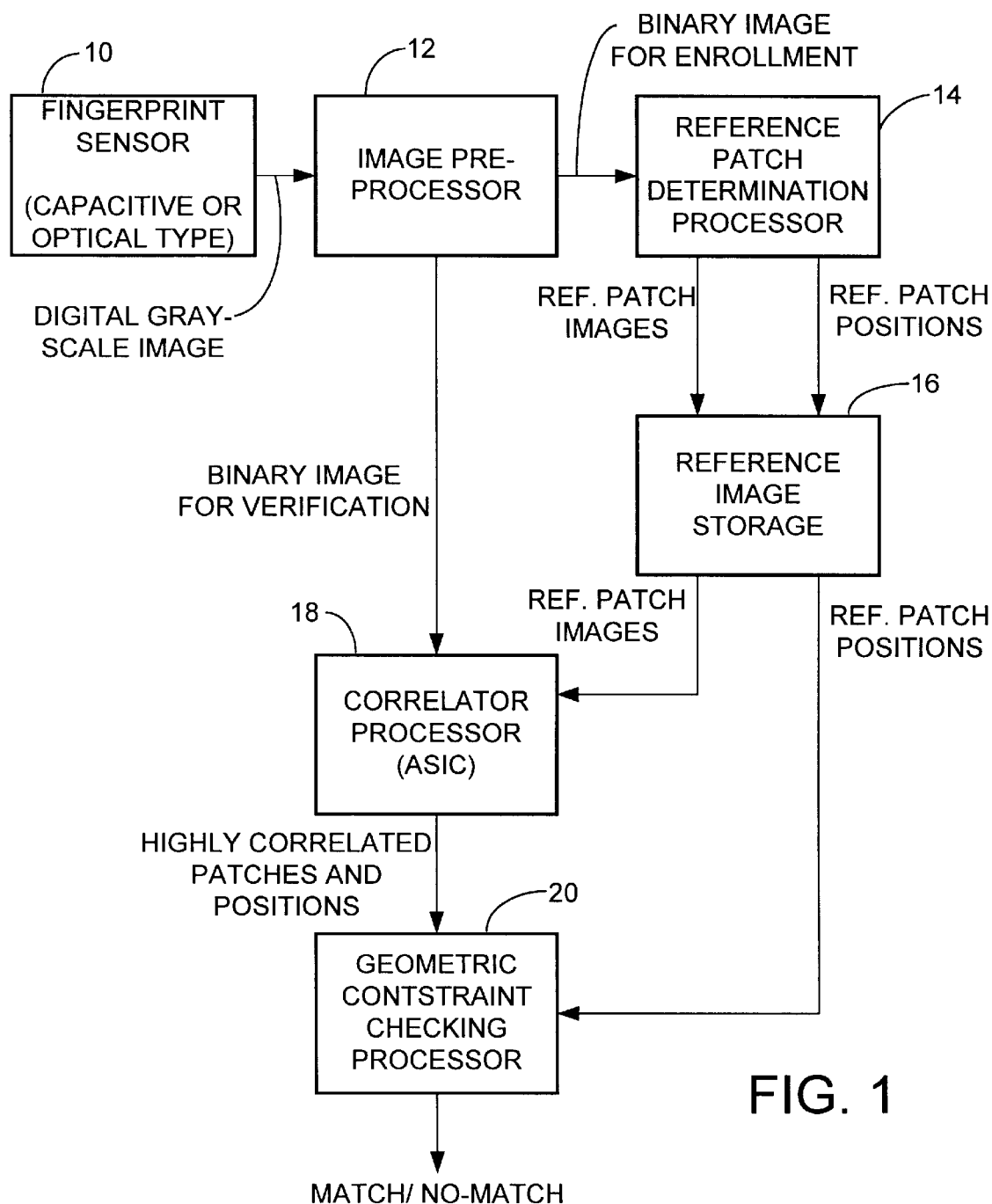
FIG. 1 is a block diagram showing the principal components of a fingerprint feature correlator in accordance with the present invention.

As shown in the drawings by way of illustration, the present invention pertains to a method and apparatus for correlation of features in fingerprint images. Fingerprint image correlators in the past either relied on the extraction and matching of pattern minutia or, even when minutia matching was not used, required programmable computers that are too bulky, costly and much too slow for many practical applications, such as controlling access to vehicles.

In accordance with the present invention, a fingerprint image is correlated with a previously stored reference image in such a way that a reliable result is obtained very quickly, but using relatively inexpensive and compact components that can be installed in a variety of locations or in a portable device.

Overview of the Invention:

In its simplest form, this invention utilizes a commercial fingerprint imaging device and a processing system that interfaces with this device to capture, store and process fingerprint images in digital form, and to perform a fingerprint verification function. This invention performs two principal operation: 1) enrollment, which includes extracting and storing reference data from a fingerprint image of a person whose identity is independently verifiable at the time of enrollment, and 2) verification, by comparing features of a new fingerprint image with the reference data stored during enrollment. To use the system, a person first enrolls. In this process, a fingerprint image is captured and reference data "patches" are extracted from this image and stored. The identity of an enrolled person can then be verified by comparing subsequently captured images to the stored reference data. The system may store reference data for more than one individual. In this case, provision is made to retrieve the appropriate data for verification, based on other identifying information supplied by the person, such as an account number or user name. In addition, the reference data may be stored integrally to the system that performs the verification, or may be stored on external media or devices. This includes "smart cards" or similar devices, which users would retain and would connect to the system when they wished to establish their identity.

The principal components of the fingerprint feature correlator are shown in FIG. 1. These include a fingerprint sensor, indicated by reference numeral 10, which may be of the capacitive or the optical type, an image pre-processor 12, a reference patch determination processor 14, reference image storage 16, a correlator processor 18, and a geometric constraint checking processor 20. In outline, the fingerprint image, which is initially a gray-scale image, is converted to a binary valued image in the image preprocessor 12, which also performs other pre-processing functions, to be described with reference to FIG. 7. In the enrollment process, the reference patch determination processor 14 then analyzes the binary fingerprint image to identify the positions of characteristic features. Smaller sub-images (or "patches") containing these features, or a subset of these sub-images, are then extracted from the complete fingerprint image. Image processing operations are applied to these sub-images, known as reference "patches," to enhance the reliability of the subsequently performed verification process. The reference patches are stored in the reference image storage 16 for use in the verification process.

In the verification mode of operation, the binary image from the image preprocessor 12 is transmitted to the correlator processor 18, which also retrieves the reference patch images from the reference image storage 16. Details of operation of the correlator processor 18 will be discussed below, but briefly the processor compares each reference patch to a binarized subject fingerprint image over a full range of positions and orientations, and attempts to find a set of one or more candidate match positions for each reference patch. The correlator processor 18, therefore, identifies for each reference patch those positions and orientations (if any) at which the reference patch is highly correlated with the subject image. These data are forwarded to the geometric constraint checking processor 20, which also retrieves reference patch positions from the reference image storage 16. The geometric constraint checking processor 20 analyzes these positions to find the maximum number of candidate match positions having relative positions that are similar to the relative positions of the reference patches. The decision to accept the verification print as a match to the reference data is based on this number.

As will be further discussed below, the correlator processor 18 in the preferred embodiment of the invention is implemented as an application specific integrated circuit chip, known simply as an ASIC chip. The ASIC implementation allows the correlation process to be performed extremely rapidly, by means of high-speed hardware that makes good use of parallel processing in the correlation. The functions of the image preprocessor 12, the reference patch determination processor 14 and the geometric constraint checking processor 20 are, in the presently preferred embodiment of the invention, performed in a conventional programmable microprocessor, such as a reduced instruction set computer (RISC) processor. It will be apparent, however, that other implementations are possible, but the speed advantage the present invention provides is attributable in large measure to the use of the ASIC chip 18 for the feature correlation process.

Figure 3:
FIG. 3 is a binary image of a fingerprint with overlaid square outlines indicating reference patches chosen in an enrollment process to identify the fingerprint.

FIG. 3 is a sample fingerprint image reduced to binary form by the image preprocessor 12, and shows the positions of multiple reference patches, in square outlines, selected to identify the fingerprint. As will be discussed, the reference patches are selected to contain combinations of bifurcations of ridges and valleys in the fingerprint image. The combination of the locations and features of the reference patches is used to identify the fingerprint uniquely without having to store an entire reference fingerprint image during enrollment and without analyzing the entire fingerprint image during verification.

Figure 4:
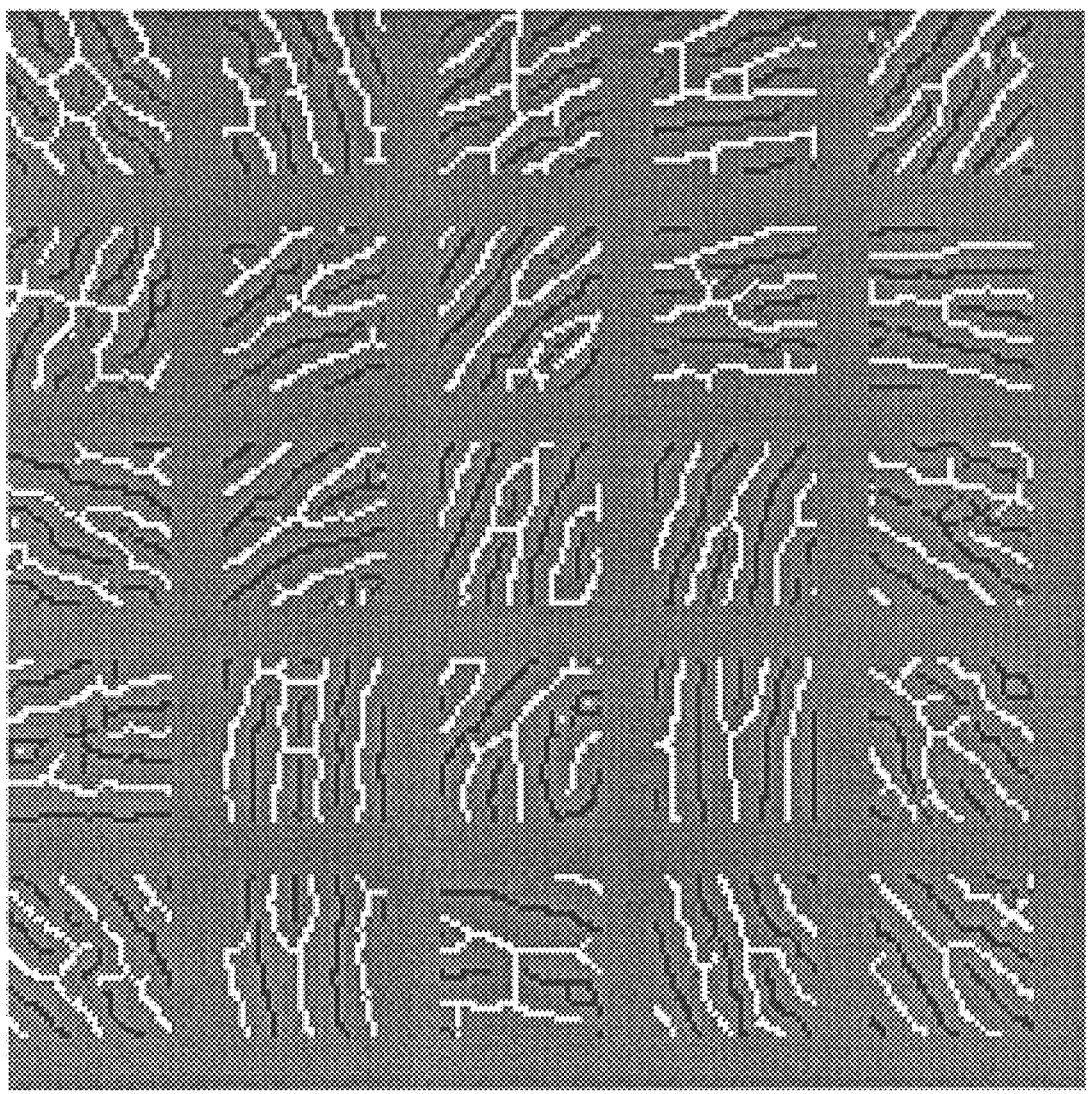
FIG. 4 is a set of trinary images of twenty-five reference patches that have been reduced to skeletal form, with white pixels indicating ridges and black pixels indicating valleys of the fingerprint pattern.

FIG. 4 shows a group of twenty-five reference patches, after conversion to a skeletonized trinary image format. In this form, only the centerlines of ridges and valleys are retained, and are stored as bits of opposite polarity. For example, ridges may be depicted as black images and stored as "1" bits, while valleys are depicted as white images and stored as "0" bits. The remaining areas of each patch are depicted as gray images. Each picture element, known as a pixel, is stored as a two-bit data element. One bit is used to indicate whether the pixel is black or white, and the other bit is used to indicate whether the pixel has "don't care" or gray status.

Figure 5:
FIG. 5 is binary image of a different fingerprint of the same finger that was used to generate the image of FIG. 3, and also showing how the reference patches of FIG. 4 may be overlaid on the binary image to verify that the fingerprints are of the same finger.
Figure 6:
FIG. 6 is a binary image of a totally different fingerprint, taken from a different person, and showing how only two of the reference patches of FIG. 4 may be successfully matched on the fingerprint image.

FIG. 5 illustrates how the reference data shown in FIG. 4 are used to verify a different image of the same finger. This figure shows a binarized and cropped fingerprint image with reference patches from the set shown in FIG. 4 overlaid on it. The patches are shown in matching positions that satisfy the geometric constraints, as found by the verification process. A comparison of FIGS. 3–5 shows that, for this example, matches for many reference patches were found in the correct relative positions. In contrast, FIG. 6 shows a similar binary image for a print that does not match the one in FIG. 3. In this case, only two of the reference patches match in the correct relative positions.

Figure 2:
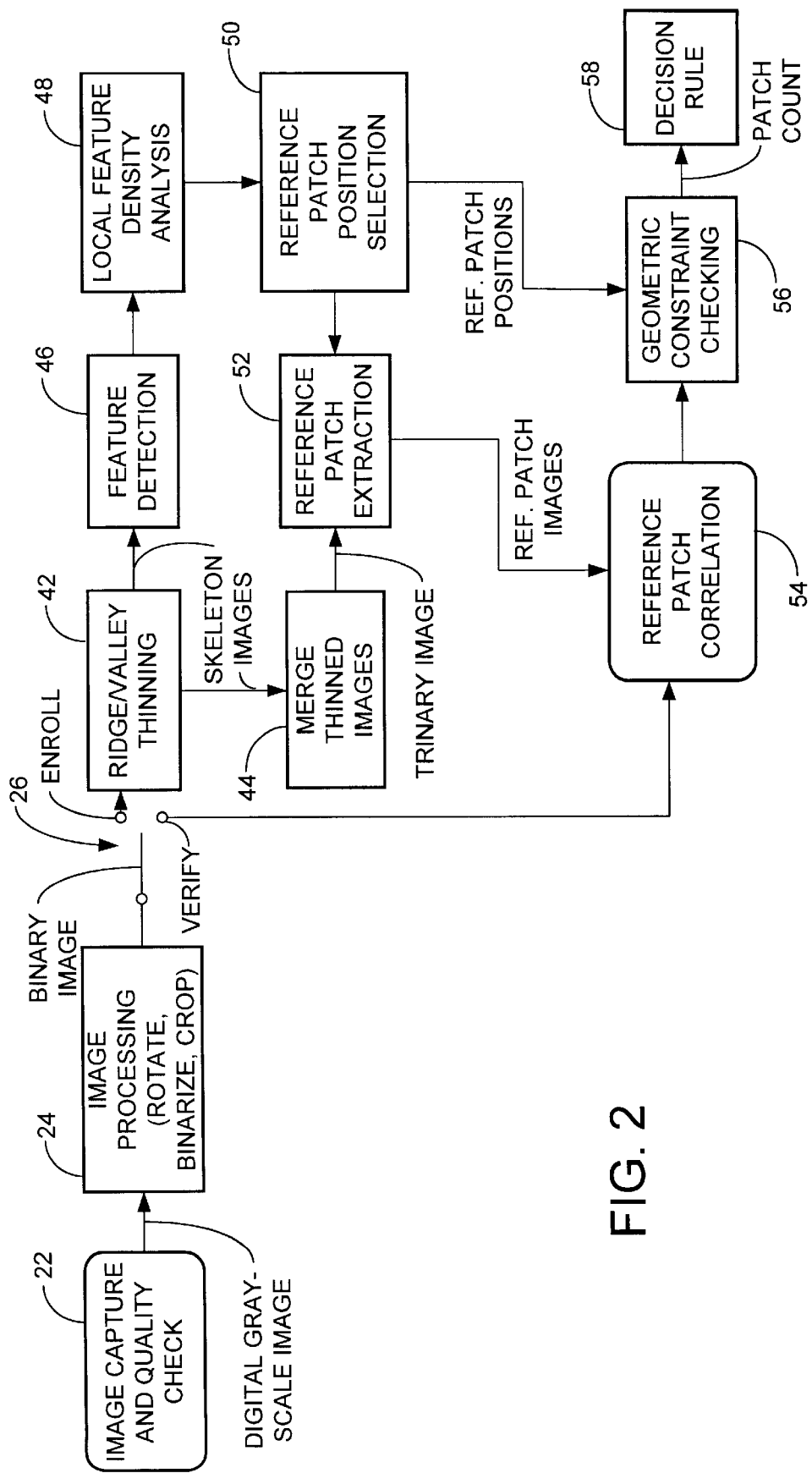
FIG. 2 is a flowchart showing the principal functions performed by the apparatus of the invention.

Image Preprocessing:

As shown in FIG. 2, preprocessing the fingerprint image includes image capture and quality checking, indicated in block 22, and image processing, indicated in block 24. These functions are performed in substantially the same manner in both the enrollment mode and the verification mode of operation. The mode is determined by a switch 26, which is typically manually operated. A practical system must include means for insuring that the enrollment mode can be activated only by authorized persons. The position of the switch 26 determines whether the binary image resulting from image processing is used in enrollment or in verification. The functions of image quality checking and processing are shown in more detail in FIG. 7.

Figure 7:
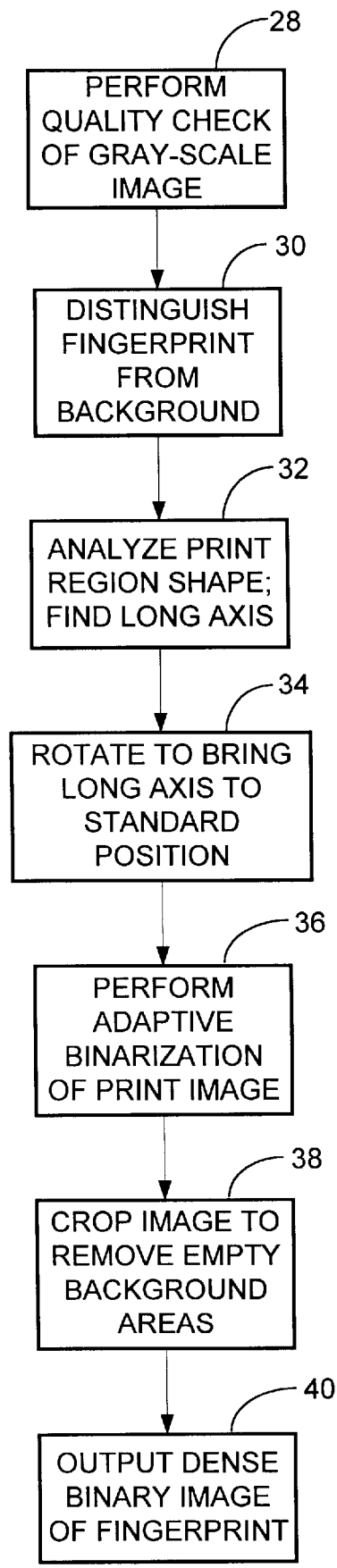
FIG. 7 is a more detailed flowchart of the image quality check and image processing steps of FIG. 2.

After the fingerprint image is captured from the fingerprint sensor 10 (FIG. 1), a quality check of the gray-scale image is performed, as indicated in block 28 (FIG. 7). The primary purpose of the quality check is to ensure that the image has not been distorted by too much or too little pressure between the finger and the fingerprint sensor. If the user applies too much pressure, the ridge images tend to merge together. Similarly, too little pressure may cause the ridges to break up. The quality check performs a rapid analysis of the ratio of ridge to valley area and aborts further processing if the image is not within prescribed limits. The next step in image processing, as indicated in block 30, is to distinguish the fingerprint area from the surrounding or background image. This reduces the amount of processing required in the correlation step, and reduces the possibility of errors due to noise artifacts in the background area. Next, as indicated in block 32, the shape of the fingerprint image is analyzed and a long axis is identified. If necessary, the image is rotated to align the long axis with a standardized direction, as indicated in block 34. All of these image processing steps reduce extraneous image content and reduce orientation uncertainty, to facilitate the later correlation of two fingerprint images taken at different times.

After the image has been aligned as needed, it is adaptively binarized to convert it to a binary image, as indicated in block 36. In adaptive binarization, each pixel of the image is converted to either black or white according to its gray-scale intensity in relation to a computed average pixel intensity of all pixels in a surrounding square region. The binary image may then be cropped to a standard size, as indicated in block 38, to remove empty background areas. Finally, as indicated in block 40, a binary image of the fingerprint is ready for output to either the enrollment process or the verification process.

Enrollment:

The effectiveness of the verification process described below depends greatly on how judiciously the reference patches are selected. Much of a fingerprint consists of simple patterns such as concentric arcs, which provide little information for discriminating between different fingers, or for locating position. In addition, because the surface of the finger is flexible and elastic, there may be geometric distortion between different images of the same finger. In order to minimize the confusing effects of such distortion, it is helpful to make the area of the reference patches small. But small patch sizes also increase the need for careful selection, in order to pack the most distinguishing information into a small area. It is also necessary to account for the variability and imperfections of the imaging process, in order to avoid selecting spurious features that are the result of noise artifacts, and to select features that remain stable despite variations in the image.

Another key consideration is the use of trinary valued reference data. If binary valued patches from a reference image were used in correlation with a verification image, a perfect match between different images of the same finger would virtually never be achieved due to the effects of noise and distortion. Pixels lying on the borders of black and white regions (i.e. on the edges of ridges or valleys) in the binary images are particularly sensitive to such effects, because only a small perturbation is required to change their state. A good representation of the reference data should capture the characteristic shape of the image features, but be insensitive to minor variations. The use of a gray, or "don't care" pixel value helps achieve this goal. Reference pixels assigned this value are not considered in the correlation process. Then the correlation can compare only those pixels that are most important to capturing the image structure. Pixels retained as black or white are selected by applying a standard skeletonization process, which removes pixels from the edges of ridges and valleys, while preserving their shape and connectivity.

The enrollment process is shown in outline in FIG. 2. When the switch 26 in the enrollment position, the binary image from the image processing step 24 is first subjected to ridge and valley thinning, as indicated in block 42, to reduce every ridge and valley of the fingerprint to a single-pixel-wide line in a skeletal image. This step is performed separately for ridges and valleys. Then the two thinned images are combined, as indicated in block 44, to produce a trinary image format that will be used for reference image storage and correlation. In the trinary image format, ridges are shown as one color, such as black, valleys are shown in the opposite color, such as white, and everything else is shown as gray. Gray pixels are treated as "don't care" pixels in the correlation process.

The thinned images of the ridges and valleys are used in feature detection, indicated in block 46, to locate areas in which there are bifurcations of ridges or valleys. The identified features are analyzed in a local feature density analysis step, shown in block 48, which provides sufficient data for reference patch position selection, shown in block 50. The latter step selects a number of reference patch candidates that together identify the fingerprint image uniquely, for most practical purposes. The selected reference patches are extracted from the entire fingerprint image, as indicated in block 52, and stored for later use in the verification process, as indicated in block 54. Similarly, the reference patch two-dimensional positions are also stored for later use in the geometric constraint checking process, indicated in block 56. The correlation and geometric constraint checking steps are describe further below. FIG. 2 also shows a decision rule block, in which a matching patch count provided by the geometric constraint checking step 56 is compared with a threshold to determine whether there is a match or not.

Figure 8:
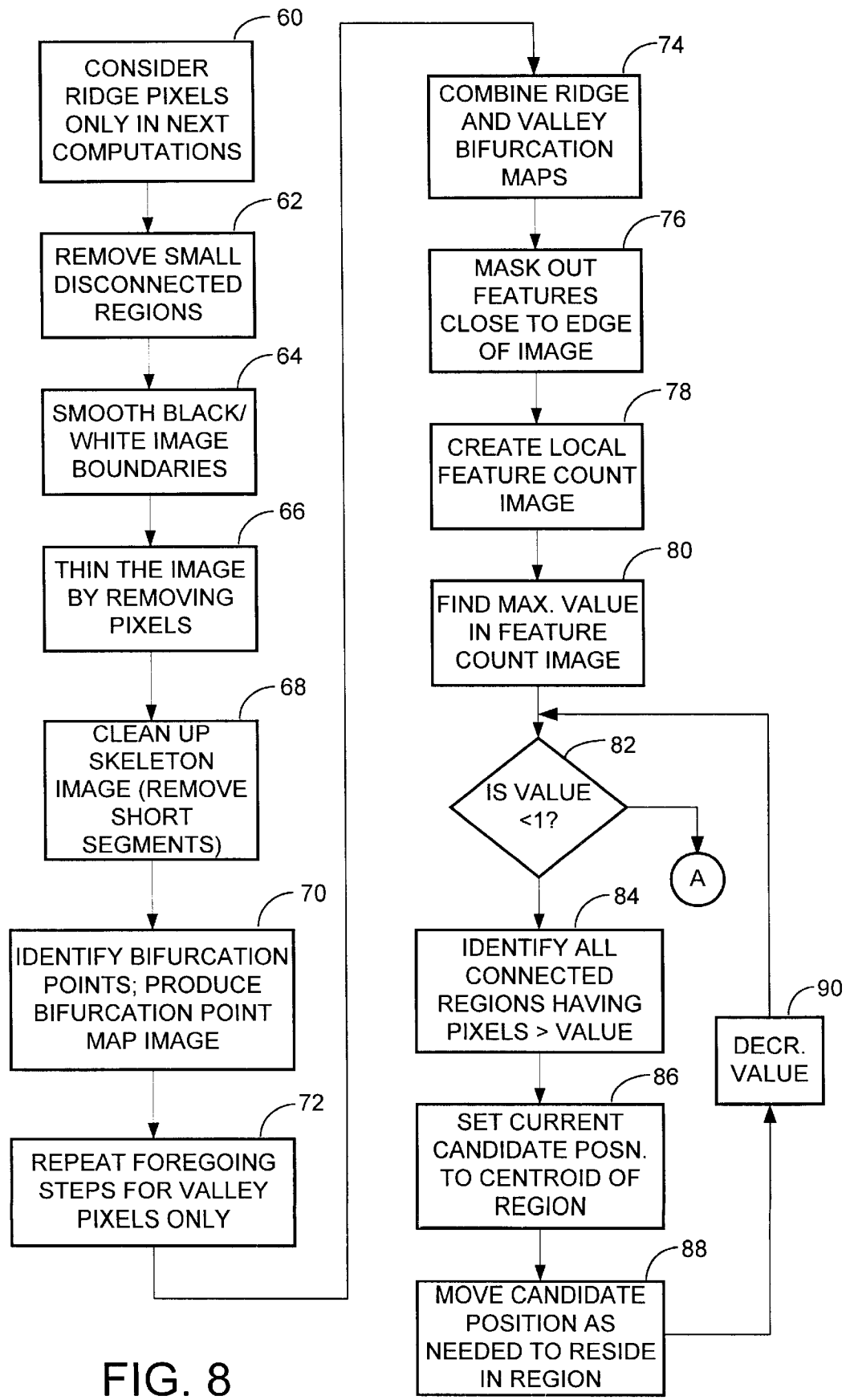
FIGS. 8 and 9 taken together are a more detailed flowchart of the enrollment functions depicted in FIG. 2.
Figure 9:
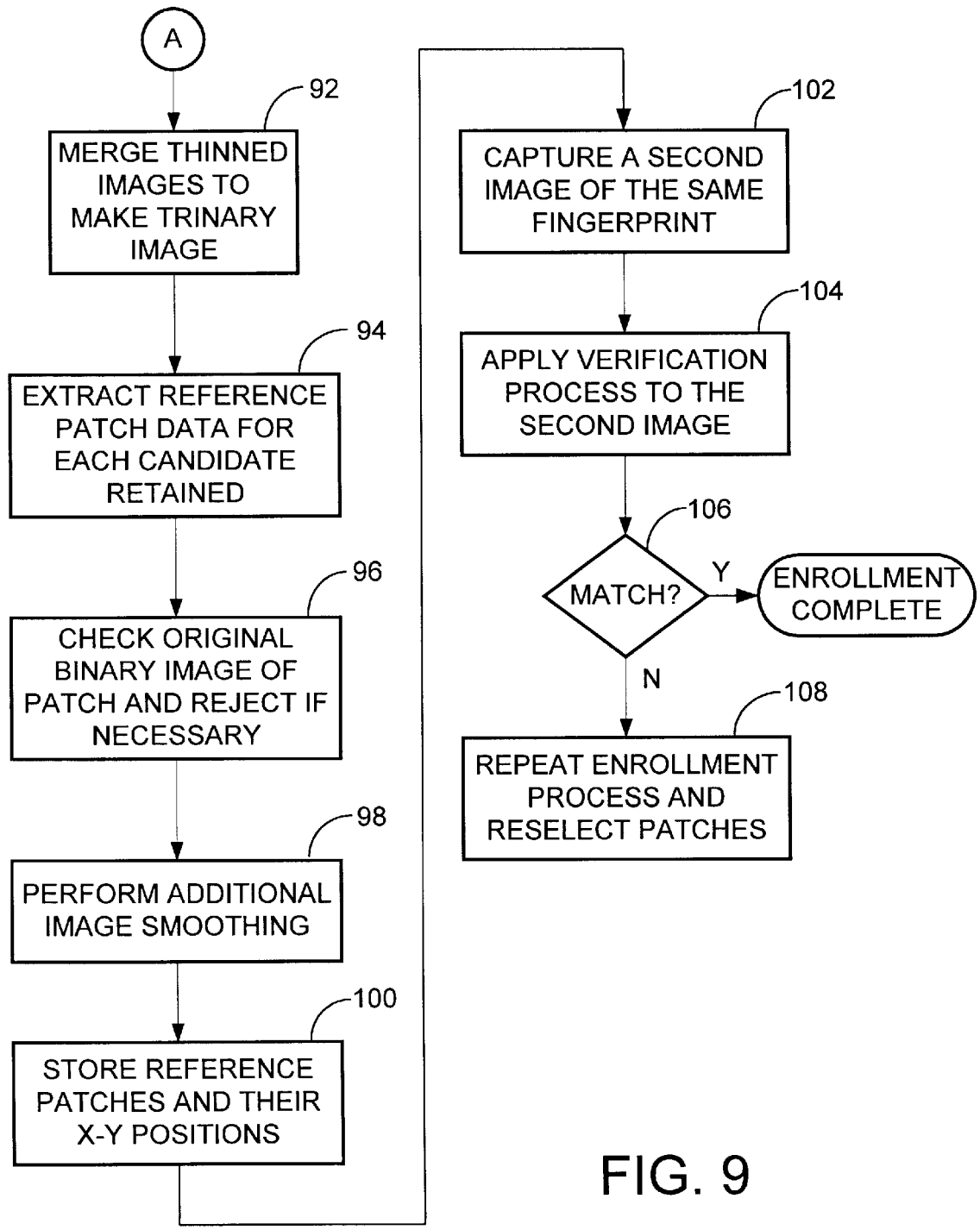

FIGS. 8 and 9 together comprise a more detailed flowchart of the functions performed in the enrollment process. As indicated in block 60, all the blocks on the lefthand side of the figure are performed first with ridge pixels considered to be foreground pixels and valley pixels considered to be background pixels. First, as indicated in block 62, the image is "cleaned up" by removing any small disconnected regions due to pores or islands in the pattern. In this step, the image is scanned for chains of less than, say, four foreground pixels and these are removed by changing their status to background. Then, as indicated in block 64, the black-white boundaries in the image are smoothed by replacing each pixel value with the majority value in a surrounding 3×3 neighborhood of pixels. Then the cleaned up image is thinned to a skeletal form, as indicated in block 66. The process for thinning is a known one in which all foreground pixels (for example all ridge pixels) that can be removed without locally disconnecting foreground regions are deleted. The process is repeatedly applied until only a thin skeletal line remains for each ridge.

The resulting skeletal lines are further cleaned up, as indicated in block 68, by removing short segments and trimming short branches from the skeleton. The foregoing steps shown in blocks 62, 64, 66 and 68 are an expansion of the ridge/valley thinning block 44 in FIG. 2.

After the skeletal image of the ridges or valleys has been produced, it is scanned to locate bifurcation points, and a bifurcation point map is generated, as indicated in block 70. This is equivalent to the feature detection step 46 in FIG. 2. The bifurcation point map contains a "1" at the location of every acceptable bifurcation point, and a zero at every other point in the map. As indicated in block 72, all of the foregoing steps 62, 64, 66, 68 and 70 are repeated with the foreground and background roles of the ridge and valley pixels interchanged. After the second pass through these steps, there are two separate bifurcation point map images for the ridges and valleys.

The next step, shown in block 74, is to combine the two bifurcation maps by performing a logical OR of each pair of corresponding pixels in the two maps. Then, before the combined bifurcation maps are further analyzed, the features close to the edges of the fingerprint are eliminated, as indicated in block 76. The combined maps are analyzed, as indicated in block 78 to create a local feature count image. Each pixel in the combined maps is replaced with a value that is the sum of the combined pixels within a square area surrounding the pixel being processed. This provides a count of the number of ridge and valley features within a square neighborhood around each pixel location, since each feature in the neighborhood contributes one to the local sum.

Reference patch selection begins by finding the maximum count in the feature count image, as indicated in block 80. The count value is checked for a value of less than "1" in block 82. This test provides an exit from the patch selection process, to be discussed later. Then the selection process identifies all connected regions in the local feature count image that have pixels with a value equal to the maximum count value, as indicated in block 84. Each such region is treated as being indicative of a reference patch candidate. The location of each candidate is selected to be the centroid of the connected region, as indicated in block 86. If the candidate position is not within the corresponding region, the position is moved until a region is encountered, as indicated in block 88. All pixel values in the feature count image within a square neighborhood of the selected position are set to zero and, if the square neighborhood is within the image bounds of the fingerprint, the candidate position is retained. (This prevents selection of reference patches that overlap excessively. The process is repeated for all of the other connected regions having the maximum count value or greater. Then the count value is decremented, as indicated in block 90, and the entire process is repeated to locate additional reference patch candidates. When the count value has been decremented to zero, the test in block 82 terminates the position selection process, and further processing continues as indicated by connector A in FIG. 9.

As shown in block 92, which corresponds to block 44 in FIG. 2, the thinned images of the ridges and valleys of the fingerprint are merged to form a trinary image. The candidate reference patches are then extracted from this trinary image of the fingerprint, as indicated in block 94. Each patch position, as determined by the process depicted in FIG. 8, is used as the center of a patch that is extracted or copied from the trinary image. As indicated in block 96, the original binary image of the patch area is checked to ensure the integrity of the ridge structure in that area. If the original ridge structure is too broken, the candidate patch is rejected. Final smoothing is performed on the extracted patch images, as indicated in block 98, by setting each interior "white" valued pixel to "gray" if it adjoins a "black" valued pixel, and vice versa. The reference patches are then stored, with their positions, as indicated in block 100.

As a double check on the enrollment process, a second image of the same fingerprint is captured, as indicated in block 102, and the verification process is applied to process the second image, as indicated in block 104. If the verification process determines that the print images match, as indicated in decision block 106, enrollment is complete. Otherwise, the entire enrollment process is repeated, as indicated in block 108, and candidate reference patches are reselected.

In order to limit the storage required for the reference data and the time required for correlation, it is necessary to limit the number of reference patches used. (The presently preferred embodiment uses sixteen patches). Frequently, more candidate patches are found in the reference image than can actually be used. If all the patches found initially are used in the verification process described above, then only those patches that matched in the second image and met the geometric constraints are retained as the actual reference data. (If fewer than the required number of patches meet these requirements, other patches must be selected from whatever unused candidates remain).

Verification:

As briefly discussed with reference to FIGS. 1 and 2, verification of a fingerprint image is performed in the correlator processor 18 and the geometric constraint checking processor 20, using the reference patch images and positions that were stored during the enrollment process. The structure and operation of the correlator processor 18 will be discussed first, since it embodies a critical element of the invention.

Figure 10:
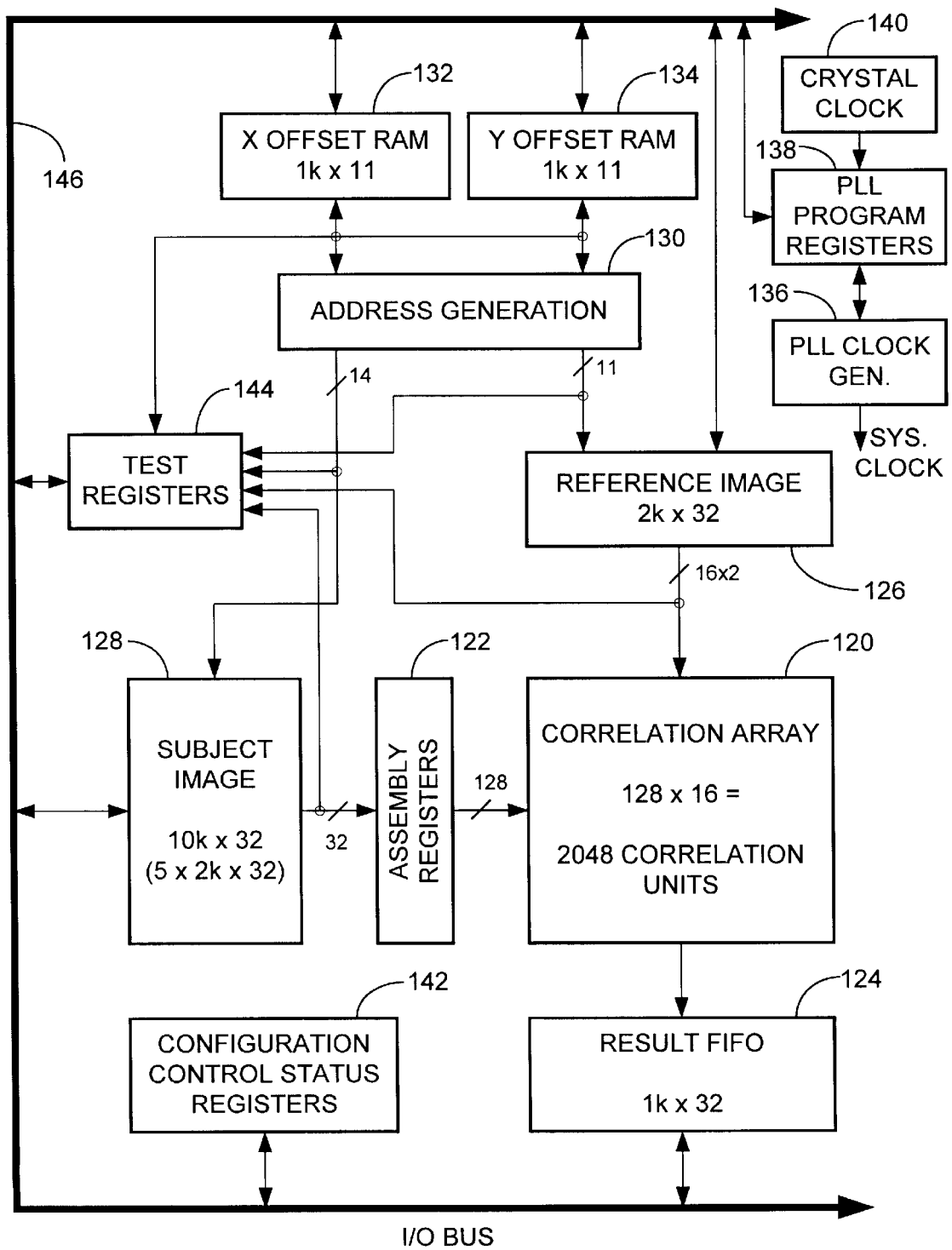
FIG. 10 is a hardware block diagram of the feature correlator processor shown in FIG. 1.

The principal components of the correlator processor 18 are shown in FIG. 10 as including a correlation array 120 of 2,048 correlator units, associated assembly registers 122, a result first-in-first-out (FIFO) memory 124, a reference image memory 126, a subject image memory 128, and address generation logic 130 for generating addresses for the reference image memory and subject image memory. The address generation logic 130 has an associated X offset RAM (random access memory) 132 and a Y offset RAM 134, which are used to generate addresses to effect rotation of reference patch images with respect to the subject image. System clock signals to the various components are generated by a phase lock loop (PLL) clock generator 136, operating in conjunction with PLL program registers 138 and a crystal clock 140. Operation of the chip is controlled in part by configuration and control status registers 142. Test registers 144 can be used to monitor operation of the components. Communication among the components of the chip, and input and output of data are effected through a common input/output (I/O) bus 146.

Figure 11:
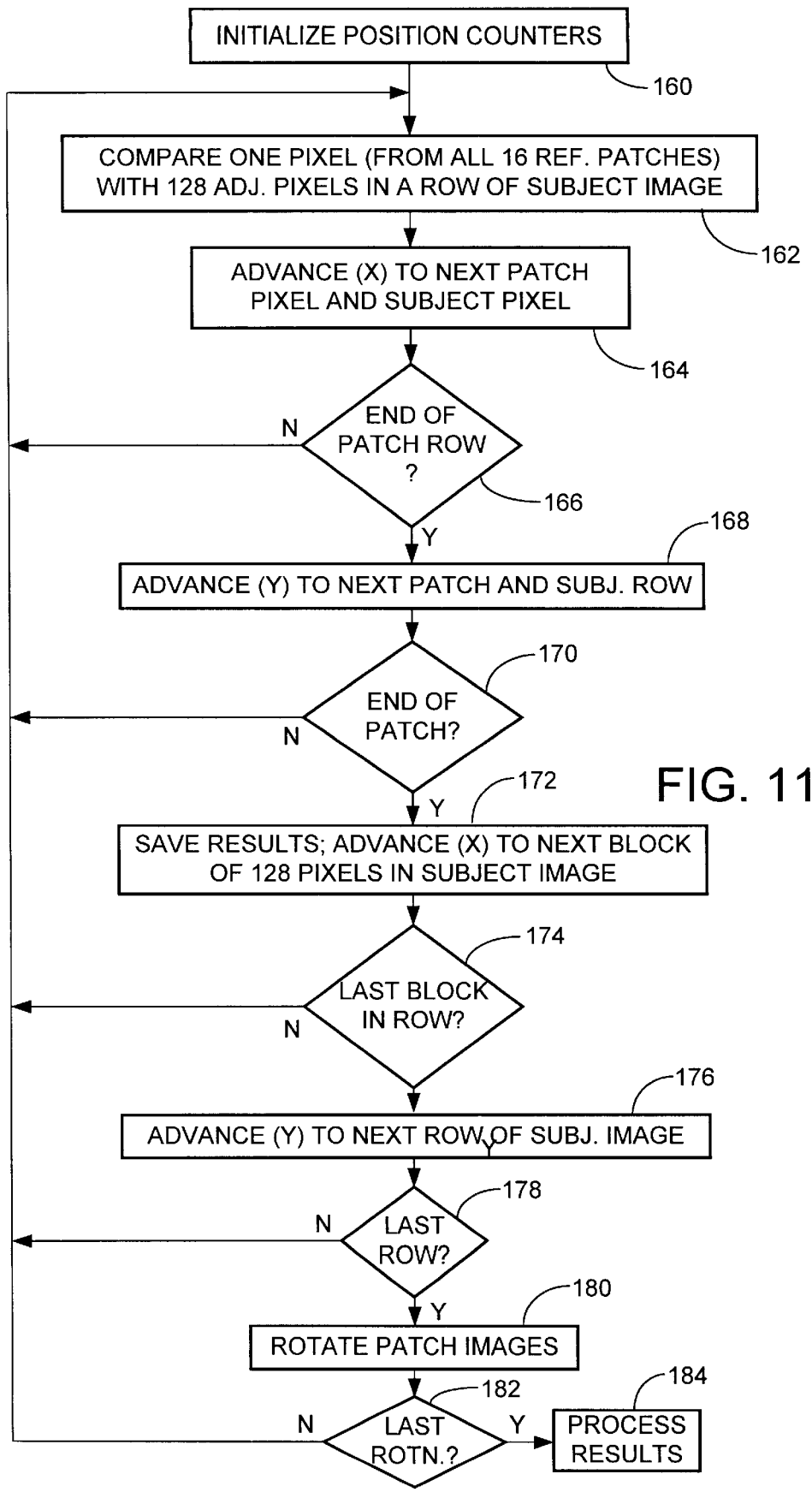
FIG. 11 is a flowchart of the functions performed by the feature correlator processor of FIG. 10.
Figure 12:
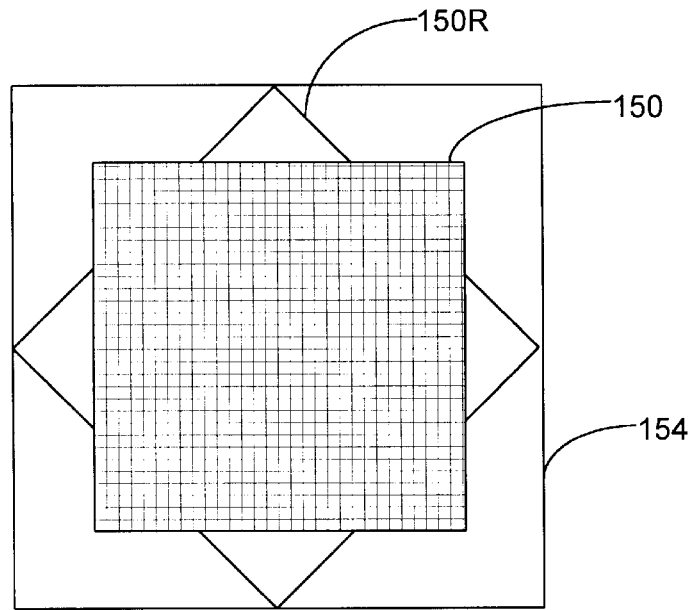
FIG. 12 is a diagram showing a reference patch in regular and rotated orientation, in relation to a reference data frame.
Figure 13:
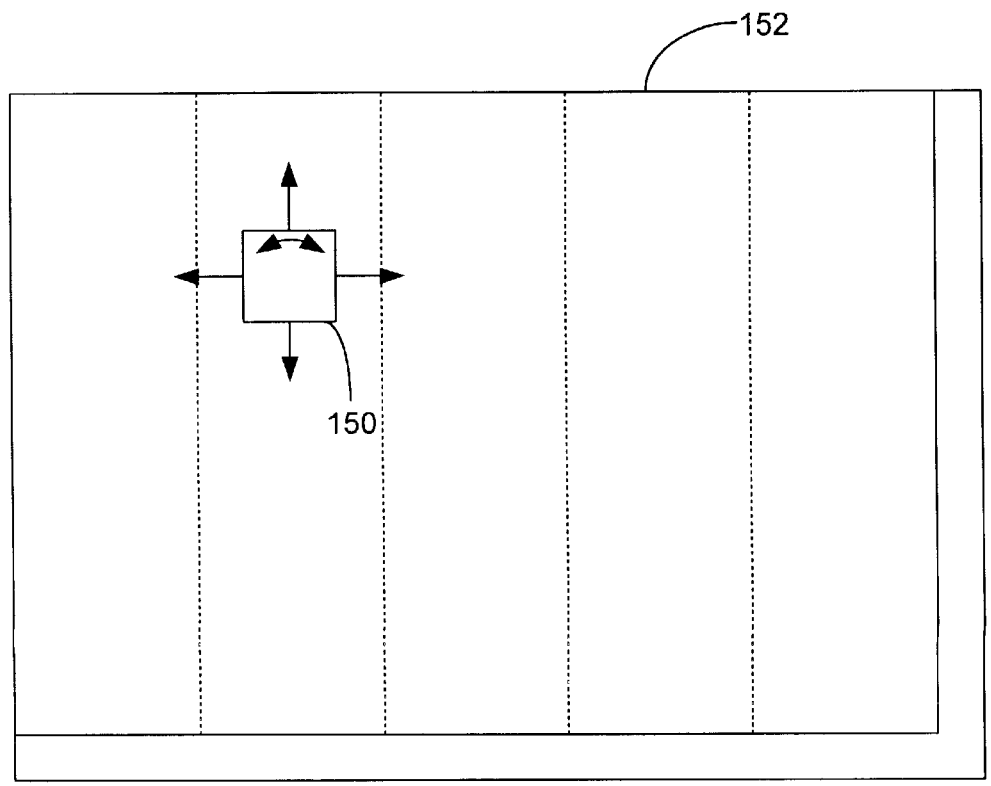
FIG. 13 is a diagram showing a subject image data frame and a reference patch that is translated and rotated with respect to the subject image data frame, in the course of the correlation process.

Operation of the correlator processor 18 shown in FIG. 10 is best understood by reference to the functional flowchart of FIG. 11 and related FIGS. 12–15. The principal function of the correlator is shown diagrammatically in FIGS. 12 and 13. FIG. 12 is a diagram of a reference patch 150. In the presently preferred embodiment of the invention, each reference patch 150 is a square array of 31×31 pixels. FIG. 13 shows by way of analogy how the correlator compares a reference patch 150 (shown to smaller scale than in FIG. 12) with the entire area of a subject fingerprint image 152, which is shown as a rectangular array of pixels. It will be recalled that the subject image 152 is a binary image that has been appropriately cropped and oriented in the same way as the image that was used for enrollment. Each reference patch is a trinary skeletal image of a selected region of the fingerprint sensed at enrollment.

The search approach scans the entire subject image 152. In effect, each reference patch 150 is scanned in the X-axis and Y-axis directions across the subject image 152, as indicated by the arrows in FIG. 13. At each X and Y position, the reference patch image 150 is compared with the underlying subject image on a pixel-by-pixel basis. A count of the non-matching pixels in the reference image is recorded for each position of the reference image with respect to the subject image, and these counts are later analyzed to select candidates for matching areas in the subject image.

To allow for possible angular misalignment of the subject fingerprint image, the whole scanning process is repeated for different angular orientations of each reference patch 150, as indicated by the curved arrow within the patch 150 in FIG. 13. Rotation is implemented using a technique shown diagrammatically in FIG. 12. The reference patch 150 is shown in a worst-case, 45-degree orientation at 150R. The rotated reference patch 150R can be accommodated in a larger square reference frame 154. For a 31×31 reference patch 150, a reference frame 154 of size 45×45 pixels will accommodate the reference patch rotated by 45 degrees. The rotation is effected in the address generation logic 130, which selects reference patch addresses with appropriate X and Y offsets so that it appears that the rotated reference patch 150R is being scanned across the subject image 152. The X offset RAM 132 and the Y offset RAM 134 have separate tables of offset values for each angular position of the reference patch 150.

A key feature of the correlator is that many of the pixel-by-pixel comparisons are performed in it simultaneously and in parallel. One aspect of this parallelism stems from the manner in which the multiple reference patches are stored as a reference image. In the presently preferred embodiment, sixteen reference patches are selected to represent the fingerprint image and each is 31×31 pixels. It will be recalled that each pixel is either a "ridge" pixel, a "valley" pixel or a "gray" pixel. Thus, each pixel uses two bits of data, wherein "00" represents a "valley" pixel, "01" represents a "ridge" pixel and "10" is "gray" or "don't care." The sixteen patches are overlaid as two-bit bitplanes in the reference image 126. One pixel representing the same location in each of the sixteen patches is stored as a 32-bit word. The entire reference frame 154 (FIG. 12) can be stored in 45×45 or 2,025 words, which is why the reference image 126 is shown as having 2 k (2,048) bits. This storage arrangement allows all 16 patches to be manipulated together as if they were a single image, as will shortly be explained with specific reference to FIG. 14, which shows relevant portions of the correlator in more detail. The correlation array 120 is shown as including 128 rows of sixteen correlation units 120u, and the assembly registers 122 are shown as including assembly staging registers 122*a* and an assembly shift register 122*b*.

Figure 14:
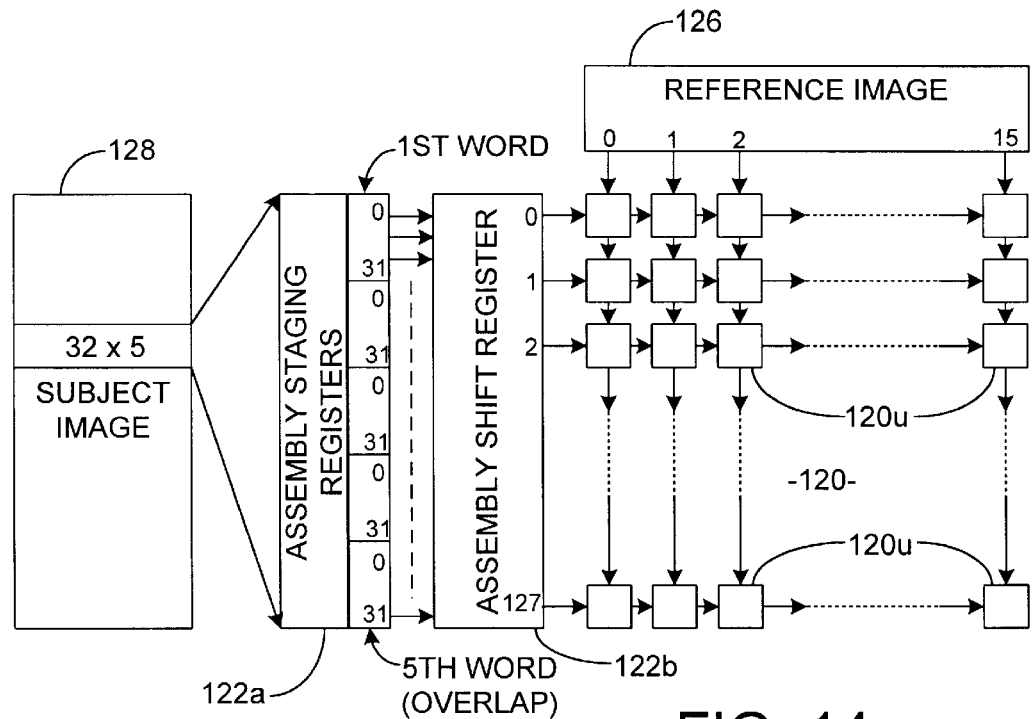
FIG. 14 is block diagram illustrating how the reference patch images are correlated with the subject image in the feature correlator processor of FIG. 1.

As indicated in FIG. 14, sixteen pairs of bits are input from the reference image to the sixteen columns of correlation units 120*u*. The vertical lines connecting the respective columns of correlation units are not intended imply that the columns operate like shift registers. Rather, each input line from the reference image 126 is applied to all the correlation units 120u in a column simultaneously, in parallel. As also indicated in FIG. 14, the pixel data from the subject image 128 are input to the correlator array 120 in a row-wise fashion. Again, the horizontal lines connecting the correlation units 120*u* are not intended to imply shift registers, but the application of each bit of input to all the units in a row in parallel. Pixel data are input from the subject image 128 in thirty-two-bit segments corresponding to thirty-two adjacent pixels in a horizontal row of the subject image. These segments are assembled in the assembly staging registers 122*a*, which have room for five such segments. Only the first four of these segments are initially used in further processing, these four providing 4×32=128 pixels from a row of the subject image 128. These four segments are transferred in parallel to the assembly shift register 122*b* and from there are input to the rows of correlator units 120*u* in the correlator array 120. Therefore, in one cycle of operation of the correlator array 120, each of the pixels in a segment of 128 pixels of the subject image is compared with one pixel from each of the sixteen reference image patches. Consider, for example, that the first pixel from each of the reference image patches is compared with all of the 128 pixels from the first row of the subject image. In this first correlator cycle, the correlator units 120*u* will generate match or no-match conditions that will be further processed at the conclusion of the correlation.

In the next correlation cycle, the second pixel from all of the reference patches will be compared with 128 pixels from the subject image, but not the same 128 pixels. Between cycles, the assembly shift register 122*b* shifts the stored pixels by one bit or pixel, in an upward direction as represented in the figure. Thus the second pixel from all of the reference patches is compared with a second set of 128 pixels from the subject image, offset by one pixel with respect to the first set. For example, if the first set of pixels is represented as including pixel #0 through pixel #127, the second set, after shifting, will include pixel #1 through pixel #128. Although the assembly shift register has 128 output bits or pixels, it has 160 shift register positions internally, to provide enough bit positions for shifting a full reference patch width. This process of comparing and shifting continues until every pixel in a full row of the reference patches has been compared with a correspondingly positioned pixel in part of a row of the subject image. Then the second row or pixels in the reference patches is similarly processed. This requires the input of pixels from a second row of the subject image. This process continues until all the pixels in the reference patches have been compared with correspondingly positioned pixels in the subject image. At this point, all the reference patches have been compared with subject image patches at 128 different patch positions along the horizontal axis of the subject image. The entire matching process is started over again using subject image pixels taken from a new position in the subject image first row, that is, beginning with pixel #128 in the first row. In effect, the reference patches are translated 128 pixels to the right. This transition to a second block of pixels in the subject image is represented by the first of four vertical dotted lines in FIG. 13. In the embodiment illustrated, the subject image 152 has five such blocks of pixels and is 640 pixels wide.

After all the blocks have been processed in this way, the correlation process is continued for different Y-axis positions on the subject image, until the reference patches have been, in effect, translated across the entire subject image in a raster scan. Finally, the correlation process is repeated using different selected rotational orientations of the reference patches.

The entire correlation process is shown in flowchart form in FIG. 11. First, position counters used to record the current X and Y positions in the reference patches and in the subject image are initialized prior to starting the correlation, as indicated in block 160. Block 162 shows a parallel compare operation in which one selected pixel of all of the reference patches is compared with 128 adjacent pixels in a row of the subject image. After each parallel compare operation, The X position is advanced both for the reference patches and for the subject image row being processed, as indicated in block 164. The steps indicated in blocks 162 and 164 are repeated until the end of the reference patch row is reached, as determined in decision block, 166. Then the Y position is advanced both for the reference patches and for the subject image, as indicated in block 168, so that the next row of the reference patches can be compared with the next row of the subject image. When all the pixels in all the rows of the reference patches have been compared with corresponding pixels in the subject image in this manner, this is equivalent to a translation of the reference patches across the top of the subject image in an X direction, by a total displacement of 128 pixels.

The end of a correlation processing sequence in which all the pixels in the multiple patches have been compared with multiple pixels in the subject image is determined as indicated in decision block 170. At this point in processing, the correlation results, which are being accumulated in the correlator units 120*u*, are saved for future processing, and the X axis position in the subject image is advanced to the next block of 128 pixels in the subject image row, as indicated in block 172. Correlation processing continues in that block in the same way as in the previous block. This results in the saving of another set of results from the correlator units 120*u*. When all the blocks in the X direction have been processed, as determined in decision block 174, pixels in the subject image must next be selected from succeeding rows of the image, by advancing a Y-axis counter for the subject image, as indicated in block 176. When all rows of the subject image have been processed, as determined in decision block 178, correlation processing is repeated after rotating the reference patch images, as indicated in block 180. As mentioned above, rotation of the reference patches is effected by adding X and Y offsets in the address generator used to generate addresses for access to the stored reference image. When correlation processing has been repeated for all desired rotational orientations, as determined in block 182, the results of all the pixel comparisons are processed, as indicated in block 184 and further discussed below.

Figure 15:
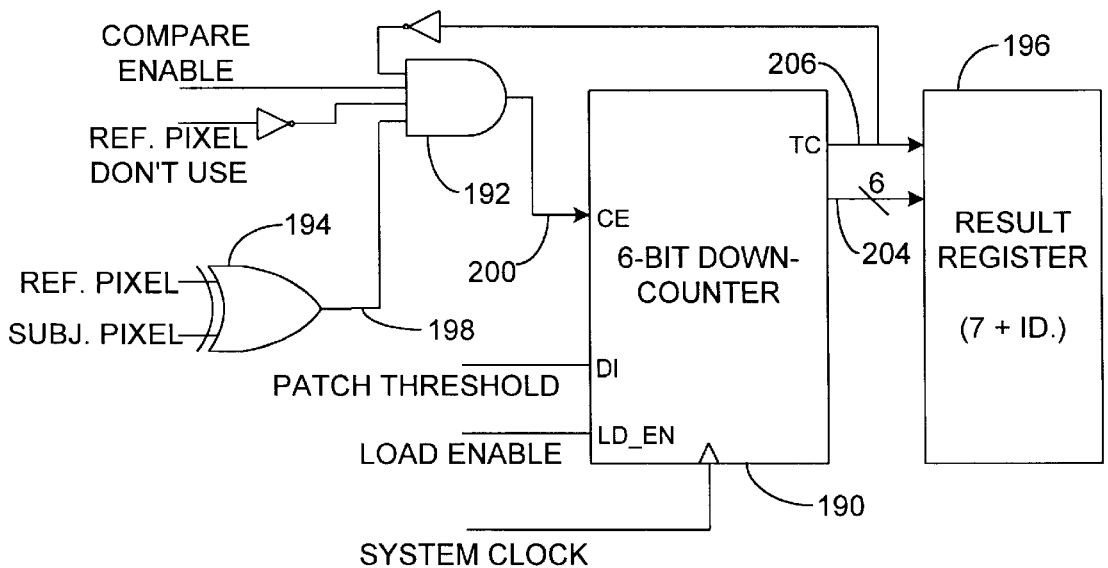
FIG. 15 is a schematic diagram of a correlator unit or sub-module within the feature correlator processor of FIG. 1.

It will be understood from the foregoing description that the correlator array 120 performs an exhaustive comparison of the subject image with the multiple reference patches. How the comparison results are counted will be best understood from the schematic diagram of a correlator unit 120*u*, as shown in FIG. 15. Each correlator unit 120*u* includes a six-bit down-counter 190, an AND gate 192, an exclusive OR gate 194 and a result register 196. The exclusive OR gate 194 has one input line from a reference pixel and one input line from a subject pixel with which a comparison is being made. If the input pixels are the same, the output on line 198 will be a logical "0" and if the input pixels are different the output will be a logical "1." This output signal on line 198 is one of four inputs to the AND gate 192. The other three inputs are: a compare-enable signal, which initiates the comparison process, an inverted "don't use" signal from the second bit of the two-bit reference pixel, and an inverted zero-count signal from the six-bit down-counter 190. Therefore, so long as the compare-enable signal is a logical "1," the "don't use" bit is a logical "0" and the down-counter 190 has not counted all the way down to zero, then the AND gate 192 produces a logical "1" output on line 200, which is connected to the count-enable input to the down-counter 190. The counter 190 also has an input for a "patch threshold" count and a load enable input that stores the patch threshold in the counter. Initially, and whenever the count results are saved, as indicated in block 174 (FIG. 11), the counter 190 is reset to a selected number, the patch threshold count. Whenever there is a non-matching compare operation, the counter 190 is decremented by one. When all the pixels in all the reference patches have been compared with a corresponding patch of the subject image, the contents of the counter 190 are output on lines 204 and saved in the result register 196, along with identifying data defining the position of the patch that has been compared in the subject image. If the counter 190 is counted down to zero, indicating a very low degree of matching, a zero output on line 206 is fed back to the AND gate 192 to disable further counting.

Figure 16:
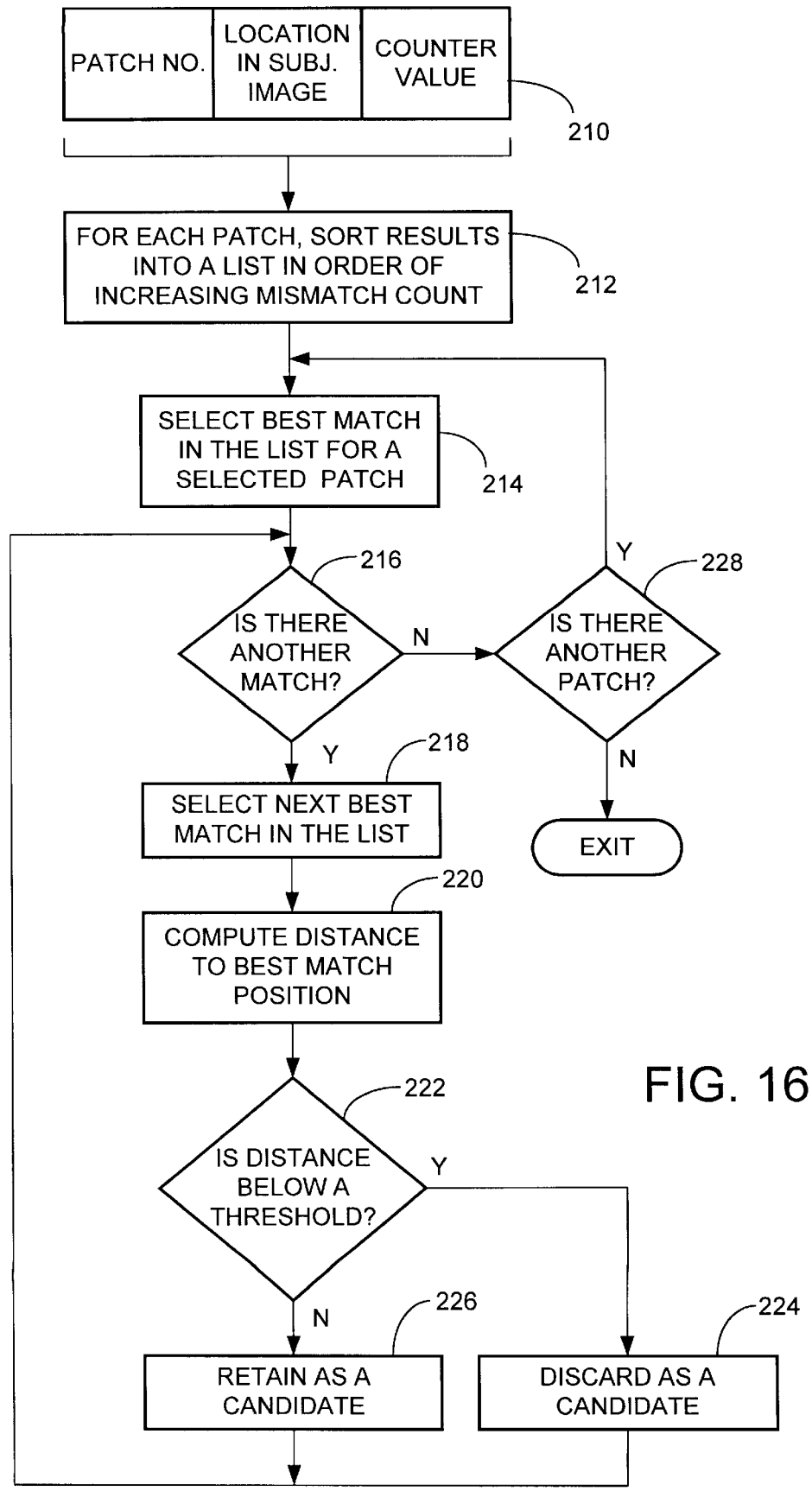
FIG. 16 is a flowchart showing how match candidates as determined in the feature correlator are further processed to obtain a list of patch candidates in the subject fingerprint image.

As indicated in block 210 in FIG. 16, each data record written to the result register 196 includes the counter value, the patch number and the location in the subject image. The location in the subject image includes X,Y coordinates and a rotation angle, if any. FIG. 16 depicts how the match count results are processed to select likely candidates for matching areas of the subject image. First, the results for each reference patch are sorted into a list by increasing mismatch count, as indicated in block 212. It will be recalled that higher counts indicate a higher degree of match because mismatching pixels cause counting downward. Then the best match is selected, for the patch being processed, as indicated in block 214. In decision block 216, a question is posed to determine whether there is another match to consider. This decision block terminates processing of matches for a particular patch. If there is another match to consider, the next best match is selected, as shown in block 218, and the distance between this match position and the position of the best match is computed, as indicated in block 220. Good matching positions will be located in clusters in the subject image. Movement of the reference patch by just one or two pixels out of registration with the best match position will, in general, still result in a high degree of match between the two images. The principle of the process steps shown in FIG. 16 is to eliminate match candidates that are so close to the best match position as to be considered part of the same matching cluster of candidates. If the distance between the current match candidate and the best match candidate is below a selected threshold, as determined in decision block 222, the current match selection is discarder a candidate, as indicated in block 224. Otherwise, the current match selection is retained as a candidate, as indicated in block 226.

Processing then continues in block 216, to determine if there is another match to analyze. Once all the matches for a selected reference patch have been examined in this way, as determined in block 216, another reference patch is selected and processing continues in block 214, in which the best match for the new reference patch is selected. Once all the reference patches have been processed, as determined in decision block 228, this phase of match result processing is complete.

At this point in processing, in general there will be multiple match candidates for each of the reference patches. The number of match candidates will depend in part on the patch threshold count with which the counters 190 are initialized before comparing each patch with an area of the subject image.

Figure 17:
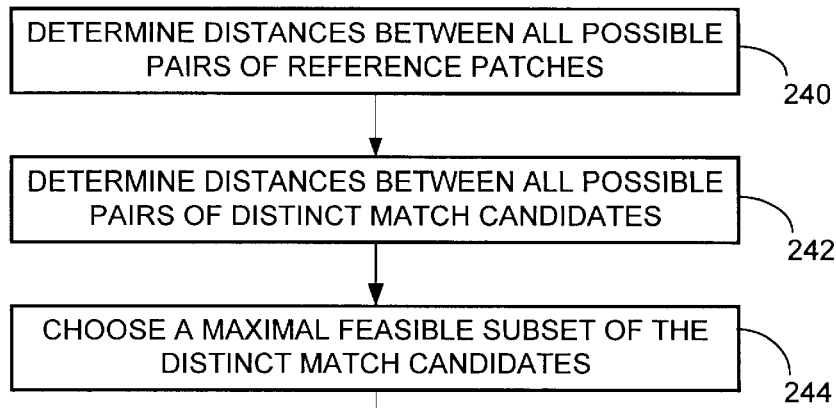
FIG. 17 is a flowchart of the functions performed in geometric constraint analysis applied to the list of patch candidates to make a final determination as to whether a subject fingerprint image matches a reference image generated during enrollment.

The final phase in processing is to determine whether there is a set of match candidates that has a desired degree of geometrical congruity with the set of reference patches. In the presently preferred embodiment of the invention, congruity between the constellation of reference patches and a corresponding constellation of candidate patches in the subject image is determined by comparing the distances between all possible pairs of the reference patches with the distances between corresponding pairs of candidate patches in the subject image. What renders this process difficult is that there may be, and usually are, more than one match candidate for each reference patch. FIG. 17 depicts the broad steps performed in determining whether these geometric constraints have been satisfied. First, as indicated in block 240, the distances between all possible pairs of reference patches are determined. Then, as indicated in block 242, a similar determination is made for the distances between all possible pairs of distinct match candidates. Distinct match candidates are those pertaining to distinct reference patches. Excluded from this step is the determination of distances between any pair of match candidates pertaining to the same reference patch. As indicated in block 244, the next step is to choose a maximal feasible subset of the distinct match candidates. A subset of the distinct match candidates is said to be "feasible" if every possible pair of distinct match candidates in that subset satisfies a geometric constraint when compared with the corresponding pair of reference patches. The geometric constraint used in the presently preferred embodiment of the invention is that the distance between the pair of match candidates under consideration is approximately equal to the distance between the corresponding pair of reference patches, within some selected tolerance. In general, there will be a plurality of feasible subsets. The selection process in block 244, which is expanded upon in FIG. 18, searches for a feasible subset whose size (i.e., number of elements) exceeds a preset threshold. If such a feasible subset is found, the result of the selection process is the size of this set. Otherwise, the result is the size of the largest feasible subset. If this number is large enough, as determined in decision block 246, a match condition is declared, as indicated at 248. Otherwise, a non-match condition is declared, as indicated at 250.

Figure 18:
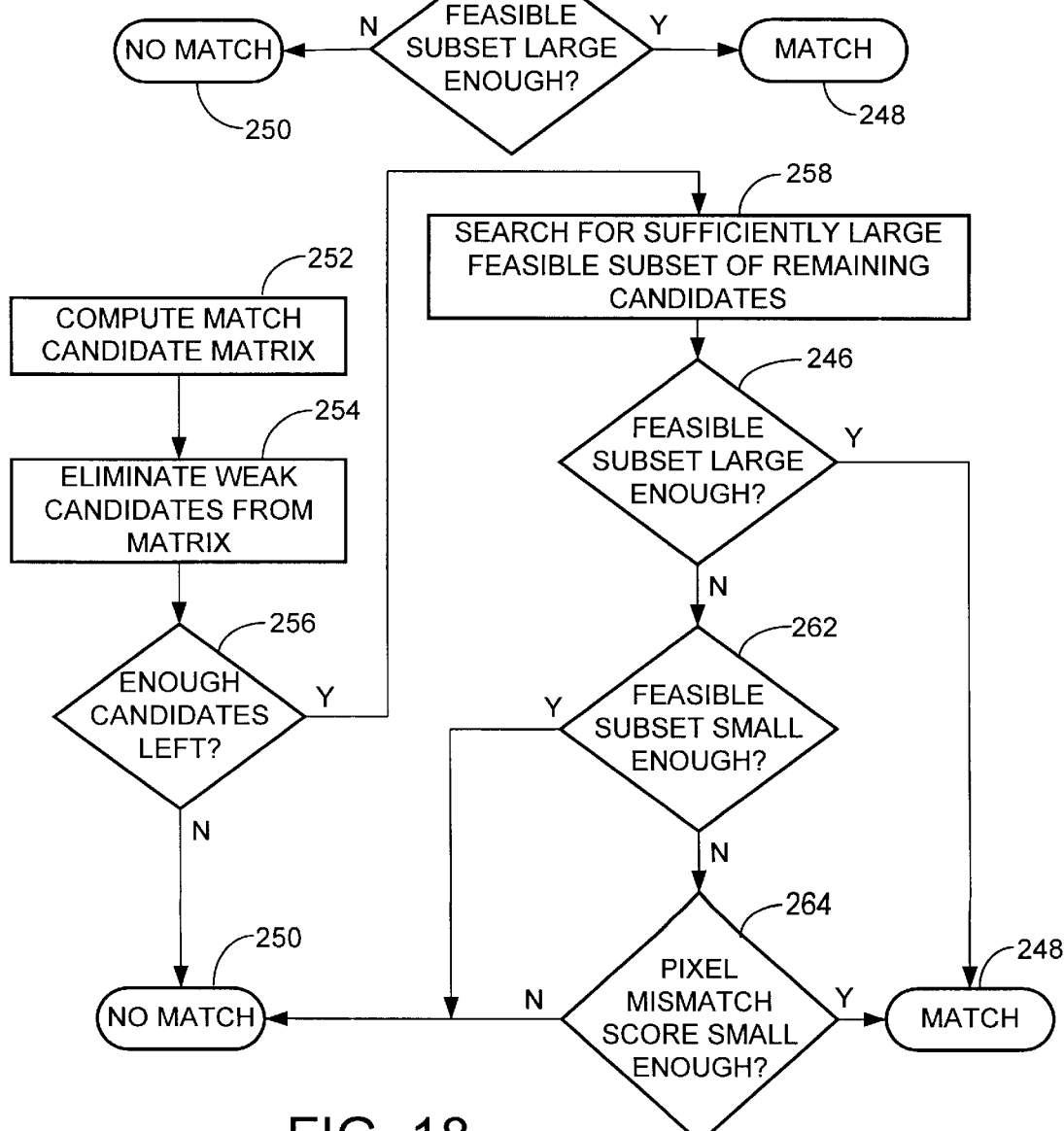
FIG. 18 is a more detailed flowchart of the geometric constraint analysis step of choosing a maximal feasible subset of distinct match candidates.

The critical step of selecting a maximal feasible subset of distinct match candidates is shown in more detail in FIG. 18. There are a number of ways this step may be implemented. One way is to simply search the entire subset of distinct match candidates for a first pair that matches the geometric constraint, and then to search again for a third candidate that meets the geometric constraint with respect to the first selected pair. The search can then be repeated in the same way for a additional candidates that satisfy the geometric constraints with respect to candidates already selected. This technique is time consuming and computationally intensive, so the presently preferred approach makes use of some intelligent shortcuts, based largely on the concept of a match candidate matrix. This is an N×N matrix of binary terms (1 or 0), where N is the total number of match candidates. For a term of the matrix to have a "1" value, it must satisfy both the geometric constraint requirement and the distinctness requirement. Distinctness means that the two candidates corresponding to the row and column numbers of the matrix term must be candidates for matching different reference patches, not the same reference patch. Satisfying the geometric constraint requirement means that the distance between the two match candidates corresponding to the row and column number of the matrix term must be approximately equal to the distance between the corresponding pair of reference patches. If a pair of match candidates does not satisfy either the distinctness requirement or the geometric constraint requirement, then the matrix term corresponding to that pair of match candidates will be zero. The matrix, computed as indicated in block 252, will be symmetrical about its diagonal of all zeros, so that fewer that half of its terms have to be computed to generate the complete matrix.

As implied by block 254, the matrix provides a simple way to eliminate weak match candidates without performing a search. A weak match candidate is one whose row (or column, because the matrix is symmetrical) has too few "ones," indicating that the candidate does not meet the geometric constraint requirement with respect to very many corresponding reference patches. For example, in a system using sixteen reference patches, as described above, one may choose as a match criterion that there must be at least four match candidates that satisfy the geometric constraints. If any row or column of the matrix has fewer than four "ones," the match candidate corresponding to this row or column may be eliminated. By the same logic, after elimination of such rows and columns, if there remain other rows and columns with fewer than four "ones," then these rows and columns should also be eliminated. If, as determined in decision block 256, there are not enough remaining match candidates after this elimination process, a no-match condition (250) is immediately declared. Otherwise, a search is initiated for a sufficiently large feasible subset, as indicated in block 258. The details of this search process are shown in FIG. 19, which is described in detail below. The results of this search are the size of the feasible subset, and an average pixel mismatch score for the patches in the feasible subset. The size is compared to an "accept" threshold, and a match is declared if the size exceeds the threshold, as indicated in decision block 260. Otherwise, if the feasible subset size is less than a "reject" threshold (which is lower than the accept threshold), then a non-match is declared, as indicated in decision block 262. If the feasible set size is between the accept and reject thresholds, the match decision is made by comparing the pixel mismatch score to a third threshold, as indicated in decision block 264.

The match candidate matrix is central to efficiently organizing the search for a sufficiently large feasible subset. Another useful concept is the notion of a canonical representation of a feasible subset. The canonical representation of any set of match candidates is defined as an increasing sequence of distinct match candidate matrix column (or row) numbers corresponding to elements of the set. (Requiring an increasing order eliminates redundant enumerations of the same set).

The canonical representation will be abbreviated as FCR, for feasible canonical representation. Yet another useful concept is that of the successor set S(n)(or simply the successors). The successor set S(n) for a match candidate of index n is the set of all match candidate indices greater than n for which the corresponding match candidates satisfy the geometric constraint. Equivalently, as viewed in the match candidate matrix, S(n) is a list of all column indices in row n of the matrix for which the corresponding matrix element value is one.

A specific example, such as the match candidate matrix shown in FIG. 19, facilitates explanation of the general search procedure and the concepts of the FCR and successor set. FIGS. 20A through 20F are a collection of tree diagrams that enumerate all the possible feasible subsets for the matrix of FIG. 19. Each tree corresponds to the collection of feasible subsets with canonical representations whose first element equals the root value. These trees have the property that if one starts at the root node (at the left of each tree) and traverses any branch, then the sequence of numbers in successive descendent nodes is a canonical representation of a feasible set. For example, the canonical representations {1, 2, 5} and {1, 5} are contained in the first tree. These representations are evident from the first row (or column) of the matrix of FIG. 19, which has a "1" in the second and fifth positions.

Suppose the number "1" is chosen as the first element of a FCR. This corresponds to the tree in FIG. 20A, with a root node of "1." By definition, all members of this feasible subset must satisfy the distance constraint with respect to match candidate "1." This is equivalent to requiring that all succeeding members of the FCR be contained in the successor set S(1)={2, 5}. Thus, the only possible second elements in the example are "2" and "5." The descendants of the "1" node therefore contain "2" and "5." Now suppose the second element of the FCR is "2." For a third element to be valid, it must satisfy distance constraints with respect to both candidates "1," and "2," i.e. it must be a successor of both "1" and "2." This means it must be an element of the intersection of the sets S(1)={2, 5} and S(2) ={4, 5, 6, 7}, which is the set {5}. Consequently, "5" is the only possible third element in this case. Alternatively, the second element in the FCR could be "5" instead of "2." This corresponds to the second branch of this tree. In this case, the possible successors of "1" are S(1)={2, 5} and the successors of "5" are S(5)={6, 7}. The intersection of these two sets is empty, so there is no possible third element in this FCR.

Having exhausted the possibilities for FCR's starting with one, an initial element of "2" is next considered. These alternatives correspond to the more complex tree with root "2" shown in FIG. 20B. However, the pattern is similar. Candidate "2" has successors {4,5,6,7}. Suppose "4" follows "2" as the second element of the FCR. Candidate "4" has successors {6,7} and the common successors of "2" and "4" are {6, 7}. Suppose the third FCR element is "6." The successor of "6" is "7," which is contained in the common successors of {6, 7} of "2" and "4," so the fourth element is "7." Element "7" has no successors, so the branch terminates at this point. Now suppose the second element of the FCR is "5" instead of "4." S(5)={6, 7} and the common successors of "2" and "5" are also "6" and "7," so in this case the next FCR elements could be "6" followed by "7," or "7" alone. The remaining possible second elements ("6" and "7") are analyzed similarly, completing the tree shown. Applying a similar analysis to the remaining possible root node values produces the other trees shown in FIGS. 20C–20F.

These trees exemplify the following general rule: the descendants of any non-root node are the cumulative intersection of the successor sets of its ancestors with the successors of that node. (A root node's descendants are simply its successors.) For any given root node, the corresponding tree is thus generated by recursively applying this rule. The size of the maximal feasible subset is found by generating a tree for each possible root node, and determining the maximum depth of these trees.

Figure 21:
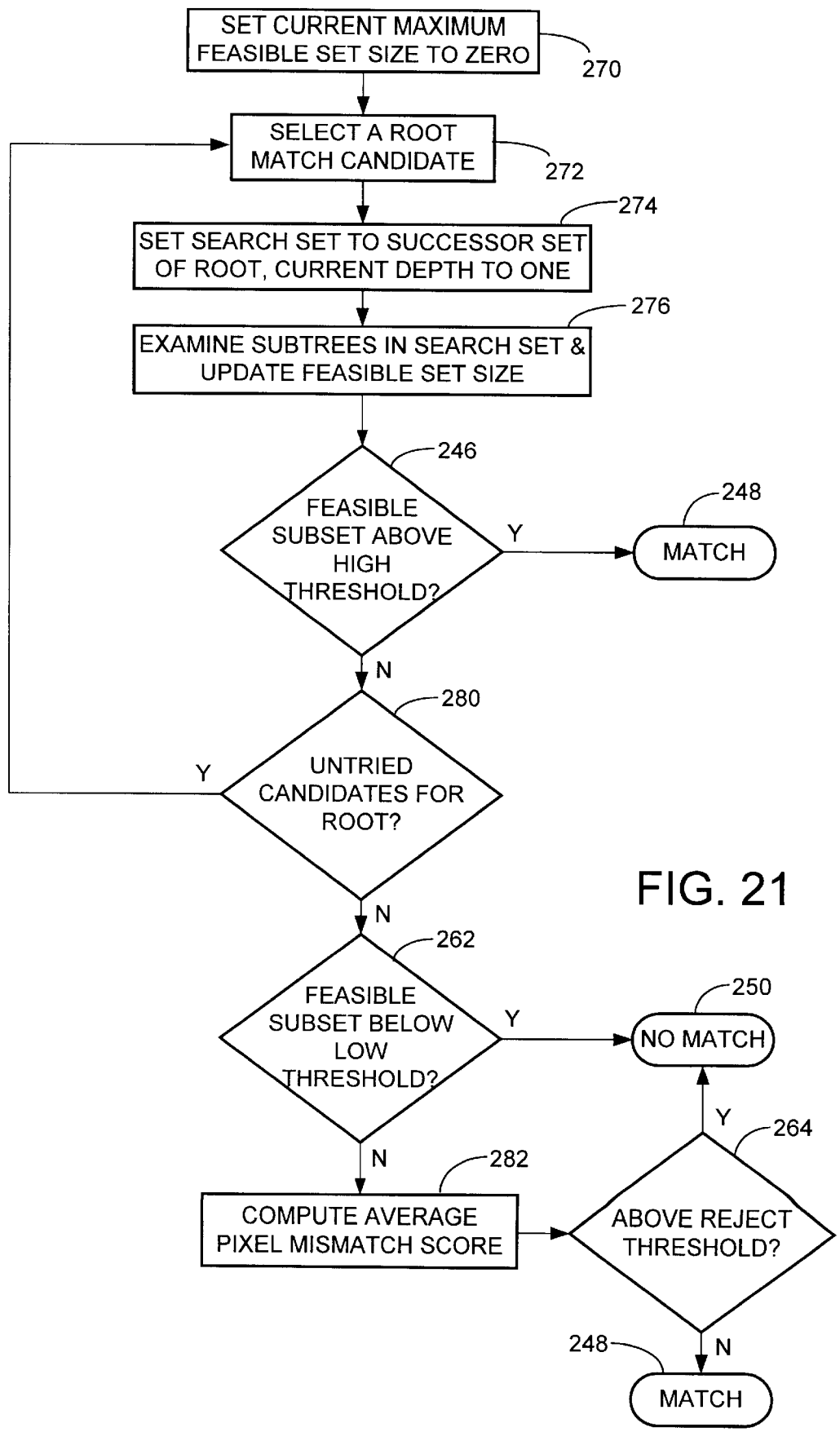
FIG. 21 is a flowchart of a search process for finding the size of a maximal feasible subset of candidate match locations in a subject fingerprint image.

FIG. 21 depicts a procedure for finding the size of a maximal feasible subset. (This figure implements the process referred to in block 244 of FIG. 17.) The current maximum feasible set size, is first set to zero, as indicated in block 270. One of the remaining match candidates is selected as the root node, as indicated in block 272. A search set is then defined, as indicated in block 274, to obtain the successors to the current root candidate. A recursive subroutine is then called, as indicated in block 276, to find the depth of each sub-tree rooted in the search set. This subroutine also updates the current maximum feasible set size whenever it finds a feasible set larger than the current size. If, upon return from this subroutine, the current maximum feasible set size exceeds a high threshold, as determined in decision block 246, a match is declared. Otherwise, if there are no untried candidates, as determined in decision block 280, this process repeats (starting from block 272) until all candidates have been examined. If all root candidates are examined without a match being declared, the current maximum feasible subset size is compared to a low threshold, as determined in decision block 262. If it is below this threshold, a non-match is immediately declared. Otherwise, the average number of mismatched pixels for the reference patches in the maximum feasible subset is computed, as indicated in block 282. If this value is above a threshold, as determined in decision block 264, a non-match is declared; otherwise a match.

Figure 22:
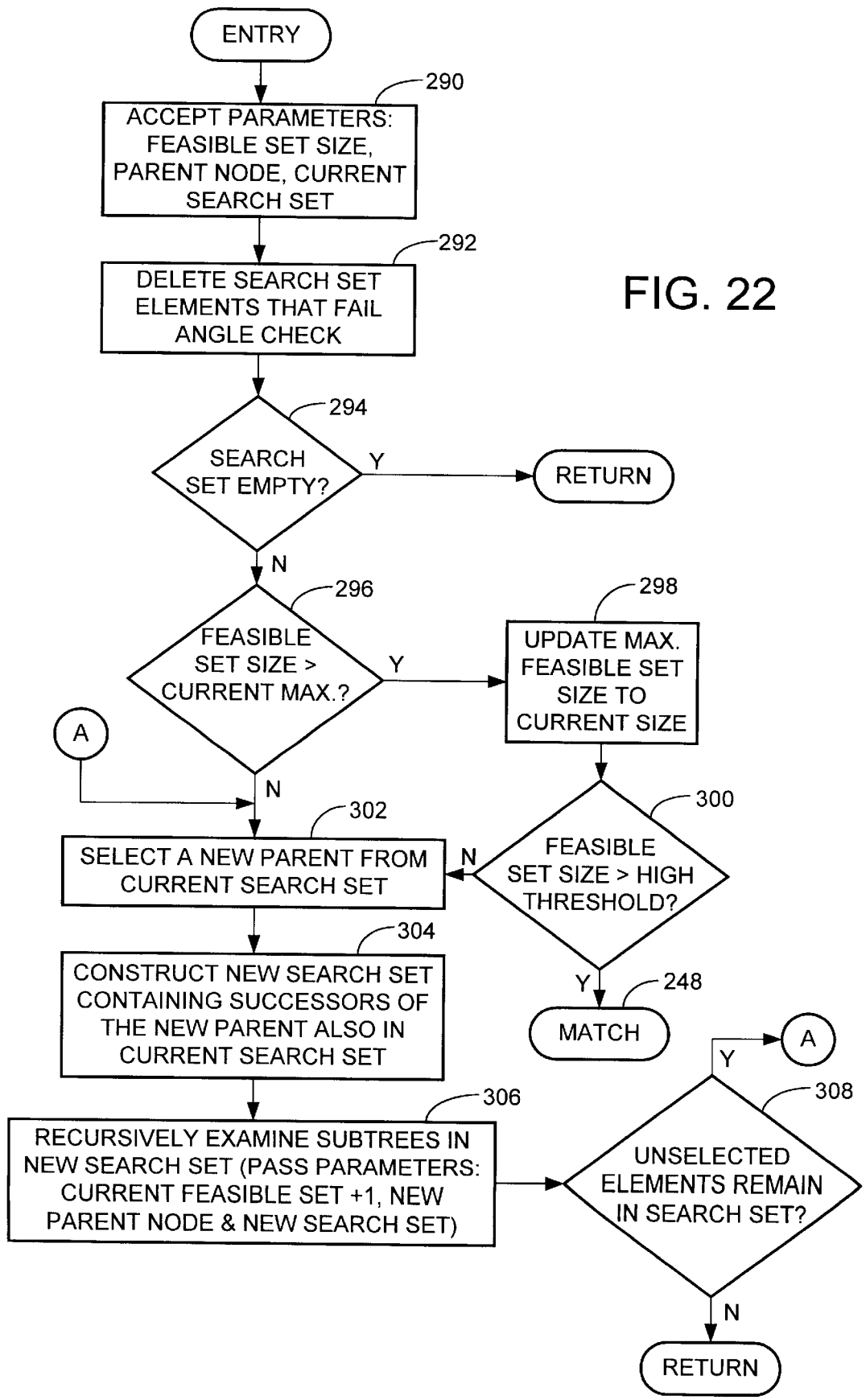
FIG. 22 is a flowchart showing more detail of the recursive procedure used in the search process of FIG. 21.

FIG. 22 shows in more detail the recursive subroutine called in block 276 of FIG. 21. The current search set, the parent node and the size of the current feasible set are passed as parameters to this subroutine and are accepted as indicated in block 290. Each invocation of this subroutine maintains independent copies of these parameters. An angle test, which will be described below, is applied to each element in the search set. Elements that fail the test are removed from the search set, as indicated in block 292. If the search set is then empty, as determined in decision block 294, the subroutine immediately returns. If the current feasible set size exceeds the maximum size seen so far, as determined in decision block 296, then the maximum depth is updated, as depicted in block 298. If this size also exceeds a high threshold, as determined in decision block 300, a match is immediately declared. Otherwise, as indicated in block 302, a new parent node element is selected from the search set, and the successor set for this element is found. A new search set, consisting of the intersection of the current search set and the new parent node's successor set, is created, as indicated in block 304. The procedure then calls itself, as indicated in block 306, passing the current feasible set plus one, the new parent node, and the new search set as parameters. After returning from this call, the process repeats itself from block 302 until all elements have been examined, as determined in decision block 308, whereupon the procedure returns.

The angle test referred to previously in block 292 makes the test of geometrical congruence more stringent. Because the geometric constraints only consider distance, they allow a constellation of positions to be matched with mirror images, as well as with legitimately congruent constellations. A test to eliminate this possibility can be incorporated into the search procedure. Consider three successive match candidates in an FCR. Label the points in the X–Y coordinate planes corresponding to the positions of the match candidates as S1, S2 and S3, respectively. Call the positions of the corresponding reference patches R1, R2, R3. Now compare the angle between the ray S1–S2 and the ray S2–S3 to the angle between the corresponding reference rays R1–R2 and R2–R3. If these two sets of points are (approximately) congruent, then these angles will be (approximately) the same. If one figure is a reflection of the other, then the signs of these two angles will be different (even though their magnitudes are the same). In practice, the more easily computed sines and cosines of the angles are compared, rather than the angles themselves. This also avoids some ambiguities inherent in representing angular measurements. The angle constraint is considered to be satisfied if the magnitudes of the differences of the corresponding sines and cosines are each less than a specified tolerance. In block 292, this test is applied to the current match candidate (passed as a parameter to the recursive search procedure), its parent match candidate, and each possible successor from the search set.

Other refinements are employed to make this geometric constraint checking procedure more efficient. Note that for any node, the depth of the sub-tree starting at that node can never be greater than the number of descendants. Consequently, if the tree depth of a node plus the number of its descendants does not exceed the maximum depth seen so far, then it is not necessary to examine the sub-tree rooted at this node, since doing so will not change the maximum depth. Also, because a match is declared whenever the maximal feasible subset size exceeds a certain threshold, the search for the maximal feasible subset can be terminated if any (not necessarily maximal) feasible subset exceeding this size threshold is found.

It will be appreciated from the foregoing that the present invention represents a significant advance in the field of fingerprint feature correlation. In particular, the invention provides for the verification of a subject fingerprint image by comparing it with multiple reference image patches in parallel. In effect, the reference image patches are scanned, in various angular orientations, across the entire subject image, to locate the positions of match candidate patches corresponding to the reference patches. Then the match candidates are further processed to identify a subset of them that satisfies geometric congruency requirements with respect to the reference patches. The number of match candidates in this subset determines whether or not the subject fingerprint image matches another fingerprint image generated during enrollment and used to derive the reference patches. It will also be appreciated that, although the invention has been described in detail for purposes of illustration, various modifications may be made without departing from the spirit and scope of the invention. Accordingly, the invention should not be limited except as by the appended claims.

We claim:

1. A fingerprint feature correlator for high-speed verification of a person's identity, comprising:

a fingerprint sensor, for generating a digital image of a fingerprint;

an enrollment processor for extracting, from a fingerprint image generated by the fingerprint sensor from the fingerprint of an identified person, multiple reference patches that together uniquely identify the image, each reference patch containing a plurality of fingerprint ridge or valley bifurcation features;

reference image storage means, for storing reference patch images and locations provided by the enrollment processor;

a correlation processor, for searching an entire subject fingerprint image generated by the fingerprint sensor from the fingerprint of a person seeking identity verification, for instances of pixel patterns similar to the stored reference patch images, and for generating a set of candidate match locations in the subject image;

a geometric constraint checking processor, for attempting to locate in the set of candidate match locations a subset of candidate match locations that is geometrically congruent with a corresponding subset of reference patch locations, to a desired degree of accuracy, and for determining whether there is a match between the subject image and the stored reference image; and an image preprocessor, for converting the digital image of the fingerprint to binary form and to a standard orientation;

and wherein the enrollment processor includes
means for thinning the binary image to obtain skeletal images of ridges and valleys in the fingerprint;
means for analyzing the skeletal images to locate bifurcation features in the ridges and valleys;
means for selecting reference patches based on feature density, and storing the reference patch positions in the reference image storage means; and
means for extracting reference patch images from the skeletal images of the ridges and valleys and storing the reference patch images in the reference image storage means with the corresponding reference patch locations.

2. A fingerprint image feature correlator as defined in claim 1, wherein the correlation processor includes:

an array of correlator units, each for comparing a selected pixel from a reference patch with a selected pixel in the subject image, wherein the entire array simultaneously compares the selected pixel from each of a plurality of reference patches with a plurality pixels in a block of pixels from the subject image;

an address generator, for generating a sequence of addresses for accessing successive pixels in the plurality of reference patches, and another sequence of addresses for accessing successive blocks of pixels in the subject image, wherein each reference patch is compared with every possible patch position in the subject image; and a result collection memory, for recording pixel match count data pertaining to every possible match candidate position in the subject image, along with match candidate locations in the subject image.

3. A fingerprint feature correlator for high-speed verification of a person's identity, comprising:

a fingerprint sensor, generating a digital image of a fingerprint;

an enrollment processor for extracting, from a fingerprint image generated by the fingerprint sensor from the fingerprint of an identified person, multiple reference patches that together uniquely identify the each reference patch containing a plurality of fingerprint ridge or valley bifurcation features;

reference image storage means, for storing reference patch images and locations provided by the enrollment processor;

a correlation processor, for searching an entire subject fingerprint image generated by the fingerprint sensor from the fingerprint of a person seeking identity verification, for instances of pixel patterns similar to the stored reference patch images, and for generating a set of candidate match locations in the subject image; and a geomertric constraint checking processor, for attempting to locate in the set of candidate match locations a subset of candidate match locations that is geometrically congruent with a corresponding subset of reference patch locations, to a desired degree of accuracy, and for determining whether there is a match between the subject image and the stored reference image;

wherein the correlation processor includes
an array of correlator units, each for comparing a selected pixel from a reference patch with a selected pixel in the subject image, wherein the entire array simultaneously compares the selected pixel from each of a plurality of reference patches with a plurality pixels in a block of pixels from the subject image;

an address generator, for generating a sequence of addresses for accessing successive pixels in the plurality of reference patches, and another sequence of addresses for accessing successive blocks of pixels in the subject image wherein each reference patch is compared with every possible patch position in the subject image; and a result collection memory, for recording pixel match count data pertaining to every possible match candidate position in the subject image, along with match candidate locations in the subject image;

and wherein the address generator further includes means for generating rotated reference patch addresses in such a way that a rotated image of each reference patch is also compared with each possible patch of the subject image.

4. A fingerprint image feature correlator as defined in claim 3, wherein the means for generating rotated reference patch addresses includes means for storing multiple sets of two-dimensional offset addresses, each set of offset addresses defining a different rotation angle, and wherein each reference patch is compared with each possible patch of the subject image at multiple orientation angles.

5. A fingerprint image feature correlator as defined in claim 2, wherein:

each correlator unit includes a counter for recording a count indicative of the degree of match between a reference patch and a patch of the subject image; and the correlation processor further includes means for saving the contents of the counters in the result collection memory on completion of a comparison of all pixels in the reference patches, and means for saving a subject image location with each count, and means for resetting the counters to begin a comparison with other locations in the subject image.

6. A fingerprint feature correlator for high-speed verification of a person's identity, comprising:

a fingerprint sensor, for generating a digital image of a fingerprint;

an enrollment processor for extracting, from a fingerprint image generated by the fingerprint sensor from the fingerprint of an identified person, multiple reference patches that together uniquely identify the image, each reference patch containing a plurality of fingerprint ridge or valley bifurcation features;

reference image storage means, for storing reference patch images and locations provided by the enrollment processor;

a correlation processor, for searching an entire subject fingerprint image generated by the fingerprint sensor from the fingerprint of a person seeking identity verification, for instances of pixel patterns similar to the stored reference patch images, and for generating a set of candidate match locations in the subject image; and a geometric constraint checking processor, for attempting to locate in the set of candidate match locations a subset of candidate match locations that is geometrically congruent with a corresponding subset of reference patch locations, to a desired degree of accuracy, and for determining whether there is a match between the subject image and the stored reference image;

wherein the correlation processor includes an array of correlator units, each for comparing a selected pixel from a reference patch with a selected pixel in the subject image, wherein the entire array simultaneously compares the selected pixel from each of a plurality of reference patches with a plurality pixels in a block of pixels from the subject image;

an address generator, for generating a sequence of addresses for accessing successive pixels in the plurality of reference patches, and another sequence of addresses for accessing successive blocks of pixels in the subject image, wherein each reference patch is compared with every possible patch position in the subject image; and a result collection memory, for recording pixel match count data pertaining to every possible match candidate position in the subject image, along with match candidate locations in the subject image;

and wherein each correlator unit includes a counter for recording a count indicative of the degree of match between a reference patch and a patch of the subject image, and the correlation processor further includes means for saving the contents of the counters in the result collection memory on completion of a comparison of all pixels in the reference patches, and means for saving a subject image location with each count, and means for resetting the counters to begin a comparison with other locations in the subject image;

and wherein the correlation processor further includes means rendered operative at the conclusion of all matching operations of the correlation processor, for selecting a set of match candidates from the results saved in the result collection memory.

7. A fingerprint image feature correlator as defined in claim 1, wherein the geometric constraint checking processor includes:

means for determining the distances between all possible pairs of reference patches;

means for determining the distances between all possible pairs of distinct match candidates;

means for selecting a feasible subset of the distinct match candidates such that the distances between all possible pairs in the feasible subset are approximately equal to the distances between corresponding pairs of reference patches; and means for declaring a match based on the size of the feasible subset.

8. A method for verifying a person's identity using fingerprint feature correlation, the method comprising the steps of:

sensing a fingerprint of an identified person wanting to enroll a fingerprint image;

generating a digital image of the fingerprint;

enrolling the fingerprint image, by finding and extracting multiple reference patches that together uniquely identify the image, each reference patch containing a plurality of fingerprint ridge or valley bifurcation features;

storing the extracted reference patch images and their locations in a reference image memory;

sensing a subject fingerprint image of a person wanting identity verification;

generating a digital subject fingerprint image from the sensed subject fingerprint image;

searching the entire subject fingerprint image for instances of pixel patterns similar to any of the stored reference patch images;

generating a set of candidate match locations in the subject image;

attempting to locate in the set of candidate match locations a subset of candidate match locations that geometrically congruent with a corresponding subset of reference patch locations, to a desired degree of accuracy;

determining whether there is a match between the subject image and the stored reference image; and preprocessing the digital image, by converting the digital image of the fingerprint array to binary form and to a standard orientation;

and wherein the enrolling step includes thinning the binary image to obtain skeletal images of ridges and valleys in the fingerprint;

analyzing the skeletal images to locate bifurcation features in the ridges and valleys;

selecting reference patches based on feature density; and extracting reference patch images from the skeletal images of the ridges and valleys.

9. A method as defined in claim 8, wherein the comparing step includes:

comparing, in a correlator unit that is one member of an array of correlator units, a selected pixel from a reference patch with a selected pixel in the subject image, wherein the entire array simultaneously compares the selected pixel from each of a plurality of reference patches with a plurality pixels in a block of pixels from the subject image;

generating a sequence of addresses for accessing successive pixels in the plurality of reference patches, and another sequence of addresses for accessing successive blocks of pixels in the subject image, wherein each reference patch is compared with every possible patch position in the subject image; and recording, in a result collection memory, pixel match count data pertaining to every possible match candidate position in the subject image, along with match candidate locations in the subject image.

10. A method for verifying a person's identity using fingerprint feature correlation, the method comprising the steps of:

sensing a fingerprint of an identified person wanting to enroll a fingerprint image;

generating a digital image of the fingerprint;

enrolling the fingerprint image, by finding and extracting multiple reference patches that together uniquely identify the image, each reference patch containing a plurality of fingerprint ridge or valley bifurcation features;

storing the extracted reference patch images and their locations in a reference image memory;

sensing a subject fingerprint image of a person wanting identity verification;

generating a digital subject fingerprint image from the sensed subject fingerprint image;

searching the entire subject fingerprint image for instances of pixel patterns similar to any of the stored reference patch images;

generating a set of candidate match locations in the subject image;

attempting to locate in the set of candidate match locations a subset of candidate match locations that is geometrically congruent with a corresponding subset of reference patch locations, to desired degree of accuracy; and determining whether there is a match between the subject image and the stored reference image;

wherein the comparing step includes comparing, in a correlator unit that is one member of an array of correlator units, a selected pixel from a reference patch with a selected pixel in the subject image, wherein the entire array simultaneously compares the selected pixel from each of a plurality of reference patches with a plurality pixels in a block of pixels from the subject image;

generating a sequence of addresses for accessing successive pixels in the plurality of reference patches, and another sequence of addresses for accessing successive blocks of pixels in the subject image, wherein each reference patch is compared with every possible patch position in the subject image; and recording, in a result collection memory, pixel match count data pertaining to every possible match candidate position in the subject image, along with match candidate locations in the subject image;

and wherein the step of generating addresses further includes generating rotated reference patch addresses in such a way that a rotated image of each reference patch is also compared with each possible patch of the subject image.

11. A method as defined in claim 10, wherein the step of generating rotated reference patch addresses includes storing multiple sets of two-dimensional offset addresses, each set of offset addresses defining a different rotation angle, and wherein each reference patch is compared with each possible patch of the subject image at multiple orientation angles.

12. A method as defined in claim 9, wherein:

each step of comparing in a correlator unit includes recording a count indicative of the degree of match between a reference patch and a patch of the subject image; and the method further comprises the steps of saving the counts in the result collection memory on completion of a comparison of all pixels in the reference patches, saving a subject image location with each count, and resetting the counts to begin a comparison with other locations in the subject image.

13. A method for verifying a person's identity using fingerprint feature correlation, the method comprising the steps of:

sensing a fingerprint of an identified person wanting to enroll a fingerprint image;

generating a digital image of the fingerprint;

enrolling the fingerprint image, by finding and extracting multiple reference patches that together uniquely identify, the image, each reference patch containing a plurality of fingerprint ridge or valley bifurcation features;

storing the extracted reference patch images and their locations in a reference image memory;

sensing a subject fingerprint image of a person wanting identity verification;

generating a digital subject fingerprint image from the sensed subject fingerprint image;

searching the entire subject fingerprint image for instances of pixel patterns similar to any of the stored reference patch images;

generating a set of candidate match locations in the subject image;

attempting to locate in the set of candidate match locations a subset of candidate match locations that is geometrically conqruent with a corresponding subset of reference patch locations, to a desired degree of accuracy; and determining whether there is a match between the subject image and the stored reference image;

wherein the comparing step includes comparing, in a correlator unit that is one member of an array of correlator units, a selected pixel from a reference patch with a selected pixel in the subject image, wherein the entire array simultaneously compares the selected pixel from each of a plurality of reference patches with a plurality pixels in a block of pixels from the subject image;

generating a sequence of addresses for accessing successive pixels in the plurality of reference patches, and another sequence of addresses for accessing successive blocks of pixel in the subject image, wherein each reference patch is compared with every possible patch position in the subject image; and recording, in a result collection memory, pixel match count data pertaining to every possible match candidate position in the subject image, along with match candidate locations in the subject image; and wherein each step of comparing in a correlator unit includes recording a count indicative of the decree of match between a reference patch and a patch of the subject image; and the method further comprises the steps of saving the counts in the result collection memory on completion of a comparison of all pixels in the reference patches, saving a subject image location with each count, and resetting the counts to begin a comparison with other locations in the subject image;

and wherein the method further comprises the step, performed at the conclusion of all matching operations, of selecting a set of match candidates from the results saved in the result collection memory.

14. A method as defined in claim 8, wherein the step of attempting to locate in the set of match candidates a subset of match candidates that is geometrically congruent with a corresponding subset of reference patches, includes:

determining the distances between all possible pairs of reference patches;

determining the distances between all possible pairs of distinct match candidates;

selecting a feasible subset of the distinct match candidates such that the distances between all possible pairs in the feasible subset are approximately equal to the distances between corresponding pairs of reference patches; and declaring a match based on the size of the feasible subset.

15. A fingerprint feature correlator for high-speed verification of a person's identity, comprising:

a fingerprint sensor, for generating a digital image of a fingerprint;

an enrollment processor for extracting, from a fingerprint image generated by the fingerprint sensor from the fingerprint of an identified person, multiple reference patches that together uniquely identify the image;

reference image storage means, for storing reference patch images and locations provided by the enrollment processor;

a correlation processor, for searching a subject fingerprint image generated by the fingerprint sensor from the fingerprint of a person seeking identity verification, for instances of pixel patterns similar to the stored reference patch images, and for generating a set of candidate match locations in the subject image; and a geometric constraint checking processor, for attempting to locate in the set of candidate match locations a subset of candidate match locations that is geometrically congruent with a corresponding subset of reference patch locations, to a desired degree of accuracy, and for determining whether there is a match between the subject image and the stored reference image;

wherein the correlation processor includes
an array of correlator units, each for comparing a selected pixel from a reference patch with a selected pixel in the subject image, wherein the entire array simultaneously compares the selected pixel from each of a plurality of reference patches with a plurality pixels in a block of pixels from the subject image, an address generator, for generating a sequence of addresses for accessing successive pixels in the plurality of reference patches, and another sequence of addresses for accessing successive blocks of pixels in the subject image, wherein each reference patch is compared with every possible patch position in the subject image, and a result collection memory, for recording pixel match count data pertaining to every possible match candidate position in the subject image, along with match candidate locations in the subject image;

and wherein each correlator unit includes a counter for recording a count indicative of the degree of match between a reference patch and a patch of the subject image;

and wherein the correlation processor further includes means for saving the contents of the counters in the result collection memory on completion of a comparison of all pixels in the reference patches, and means for saving a subject image location with each count, and means for resetting the counters to begin a comparison with other locations in the subject image;

and wherein the correlation processor further includes means rendered operative at the conclusion of all matching operations of the correlation processor, for selecting a set of match candidates from the results saved in the result collection memory;

and wherein the means for selecting a set of match candidates includes means for discarding match candidates that are positioned in the subject image relatively close to a better candidate.

16. A method for verifying a person's identity using fingerprint feature correlation, the method comprising the steps of:

sensing a fingerprint of an identified person wanting to enroll a fingerprint image;

generating a digital image of the fingerprint;

enrolling the fingerprint image, by finding and extracting multiple reference patches that together uniquely identify the image;

storing the extracted reference patch images and their locations in a reference image memory;

sensing a subject fingerprint image of a person wanting identity verification;

generating a digital subject fingerprint image from the sensed subject fingerprint image;

searching the subject fingerprint image for instances of pixel patterns similar to any of the stored reference patch images;

generating a set of candidate match locations in the subject image;

attempting to locate in the set of candidate match locations a subset of candidate match locations that is geometrically congruent with a corresponding subset of reference patch locations, to a desired degree of accuracy; and determining whether there is a match between the subject image and the stored reference image;

wherein the comparing step includes
comparing, in a correlator unit that is one member of an array of correlator units, a selected pixel from a reference patch with a selected pixel in the subject image, wherein the entire array simultaneously compares the selected pixel from each of a plurality of reference patches with a plurality pixels in a block of pixels from the subject image, generating a sequence of addresses for accessing successive pixels in the plurality of reference patches, and another sequence of addresses for accessing successive blocks of pixels in the subject image, wherein each reference patch is compared with every possible patch position in the subject image, and recording, in a result collection memory, pixel match count data pertaining to every possible match candidate position in the subject image, along with match candidate locations in the subject image;

and wherein each step of comparing in a correlator unit includes recording a count indicative of the degree of match between a reference patch and a patch of the subject image;

and wherein the method further comprises the steps of saving the counts in the result collection memory on completion of a comparison of all pixels in the reference patches, saving a subject image location with each count, and resetting the counts to begin a comparison with other locations in the subject image;

and wherein the method further comprises the step, performed at the conclusion of all matching operations, of selecting a set of match candidates from the results saved in the result collection memory;

and wherein the step of selecting a set of match candidates includes discarding match candidates that are positioned in the subject image relatively close to a better candidate.

* * * * *